US012499650B2

(12) United States Patent
Kakimoto et al.

(10) Patent No.: US 12,499,650 B2
(45) Date of Patent: Dec. 16, 2025

(54) INFORMATION PROCESSING APPARATUS, INFORMATION PROCESSING METHOD, AND NON-TRANSITORY COMPUTER READABLE MEDIUM

(71) Applicants: KABUSHIKI KAISHA TOSHIBA, Tokyo (JP); Toshiba Energy Systems & Solutions Corporation, Kawasaki (JP)

(72) Inventors: Mitsuru Kakimoto, Kawasaki Kanagawa (JP); Ryoma Fukuhara, Tokyo (JP); Hiromasa Shin, Yokohama Kanagawa (JP)

(73) Assignees: Kabushiki Kaisha Toshiba, Kawasaki (JP); Toshiba Energy Systems & Solutions Corporation, Kawasaki (JP)

( * ) Notice: Subject to any disclaimer, the term of this patent is extended or adjusted under 35 U.S.C. 154(b) by 364 days.

(21) Appl. No.: 17/940,856

(22) Filed: Sep. 8, 2022

(65) Prior Publication Data

US 2023/0186594 A1 Jun. 15, 2023

(30) Foreign Application Priority Data

Dec. 10, 2021 (JP) ................. 2021-200975

(51) Int. Cl.
*G06V 10/60* (2022.01)
*G06V 10/26* (2022.01)
*G06V 20/13* (2022.01)

(52) U.S. Cl.
CPC ............. *G06V 10/60* (2022.01); *G06V 20/13* (2022.01)

(58) Field of Classification Search
CPC ............................. G06V 10/60; G06V 20/13
See application file for complete search history.

(56) References Cited

U.S. PATENT DOCUMENTS

| | | | |
|---|---|---|---|
| 5,255,190 A | * | 10/1993 | Sznaider ................. G06T 15/50 |
| | | | 702/3 |
| 10,989,839 B1 | | 4/2021 | Matthews |
| 11,294,098 B2 | | 4/2022 | Kakimoto et al. |

(Continued)

FOREIGN PATENT DOCUMENTS

| | | | |
|---|---|---|---|
| JP | 2001264456 A | * | 9/2001 |
| JP | 2003-90887 A | | 3/2003 |

(Continued)

OTHER PUBLICATIONS

Minnis, Patrick, et al. "Advances in neural network detection and retrieval of multilayer clouds for CERES using multispectral satellite data." Remote Sensing of Clouds and the Atmosphere XXIV. vol. 11152. SPIE, Oct. 2019 (Year: 2019).*

(Continued)

*Primary Examiner* — Oneal R Mistry
*Assistant Examiner* — Nhut Huy Pham
(74) *Attorney, Agent, or Firm* — Finnegan, Henderson, Farabow, Garrett & Dunner, LLP

(57) ABSTRACT

An information processing apparatus according to an embodiment includes a first estimator configured to estimate height information of a cloud based on data obtained by sensing the cloud, a divider configured to divide the cloud into a plurality of portions based on the height information, and a second estimator configured to estimate states of the cloud at target time for each of the portions.

20 Claims, 28 Drawing Sheets

(56) References Cited

U.S. PATENT DOCUMENTS

| | | | | |
|---|---|---|---|---|
| 2010/0309330 | A1* | 12/2010 | Beck | G01W 1/10 |
| | | | | 348/222.1 |
| 2017/0299686 | A1* | 10/2017 | Bertin | G01S 3/786 |
| 2019/0004211 | A1* | 1/2019 | Kakimoto | G01W 1/10 |
| 2020/0142095 | A1* | 5/2020 | Yan | G06V 20/13 |

FOREIGN PATENT DOCUMENTS

| | | | | |
|---|---|---|---|---|
| JP | 2009252940 | A | * 10/2009 | |
| JP | 2010-32383 | A | 2/2010 | |
| JP | 2010-151597 | A | 7/2010 | |
| JP | 2019-15517 | A | 1/2019 | |
| JP | 2021-9075 | A | 1/2021 | |
| WO | WO-2016030951 | A1 * | 3/2016 | G01W 1/00 |

OTHER PUBLICATIONS

Hayatbini, Negin, et al. "Effective cloud detection and segmentation using a gradient-based algorithm for satellite imagery: Application to improve PERSIANN-CCS." Journal of Hydrometeorology 20.5 (2019): 901-913. (Year: 2019).*

Berthomier, Léa et al. "Cloud cover nowcasting with deep learning." IEEE, published 2020 (Year: 2020).*

Minnis, Patrick, et al. "Advances in neural network detection and retrieval of multilayer clouds for CERES using multispectral satellite data." Remote Sensing of Clouds and the Atmosphere, published 2019 (Year: 2019).*

Japan Patent Office, Office Action in JP App. No. 2021-200975, 2 pages, with machine translation, 4 pages (Dec. 3, 2024).

Kazuyori Ozeki et al., "Introduction of Himawari—8/9," Meteorological Satellite Center Technical Note, pp. 3-16 (2016).

Atsushi Hashimoto et al., "Development of a Satellite-based Estimation and Forecasting Model of Solar Irradiance for Photovoltaic Power Prediction," Central Res. Inst. of Elec. Power Ind., Tech. Report N13003, 30 pages (2013).

Maarten Reyniers, "Quantitative Precipitation Forecasts based on radar observations: principles, algorithms and operational systems," Royal Meteorological Institute of Belgium, 62 pages (2008).

Trevor Hastie et al., "The Elements of Statistical Learning, Data Mining, Inference, and Prediction," 2d Ed., Springer, New York, 764 pages (2008).

Mryka Hall-Beyer, "GLCM Texture: A Tutorial," v.3.0, University of Calgary Digital Library, 76 pages (2017).

M. Lalitha et al., "A Survey on Image Segmentation through Clustering Algorithm," Int'l J. of Sci. and Res., vol. 2, No. 2, pp. 348-358 (2013).

Benoit Cushman-Roisin et al., "Introduction to Geophysical fluid Dynamics: Physical and Numerical Aspects," 2d Ed., Academic Press, Waltham, Mass., pp. v-xi, and 183-186 (2011).

Gerhard Winkler, "Image Analysis, Random Fields and Markov Chain Monte Carlo Methods: A Mathematical Introduction," 2d Ed., Springer, New York, pp. I, XV, XVI, and 12-14 (2003).

G. Dedieu et al., "Satellite Estimation of Solar Irradiance at the Surface of the Earth and of Surface Albedo Using a Physical Model Applied to Metcosat Data," J. of Applied Meteorology and Climatology, vol. 26, No. 1, pp. 79-87 (1987).

* cited by examiner

INFORMATION PROCESSING APPARATUS, INFORMATION PROCESSING METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2021-200975, filed on Dec. 10, 2021, the entire contents of which are incorporated herein by reference.

FIELD

Embodiments relate to an information processing apparatus, an information processing method, and a non-transitory computer readable medium.

BACKGROUND

There is a method of calculating, from a satellite image, a movement vector representing a movement of a cloud and predicting (extrapolating) the movement of the cloud based on the movement vector to thereby estimate a future position of the cloud. In this method, when a plurality of clouds are three-dimensionally stacked, a movement vector of the clouds cannot be accurately estimated.

DETAILED DESCRIPTION

According to one embodiment, an information processing apparatus includes: a first estimator configured to estimate height information of a cloud based on sensing data of the cloud; a divider configured to divide the cloud into a plurality of portions based on the height information; and a second estimator configured to estimate states of the cloud at target time for each of the portions.

Below, embodiments will be explained with reference to the drawings.

First Embodiment

Figure 1:
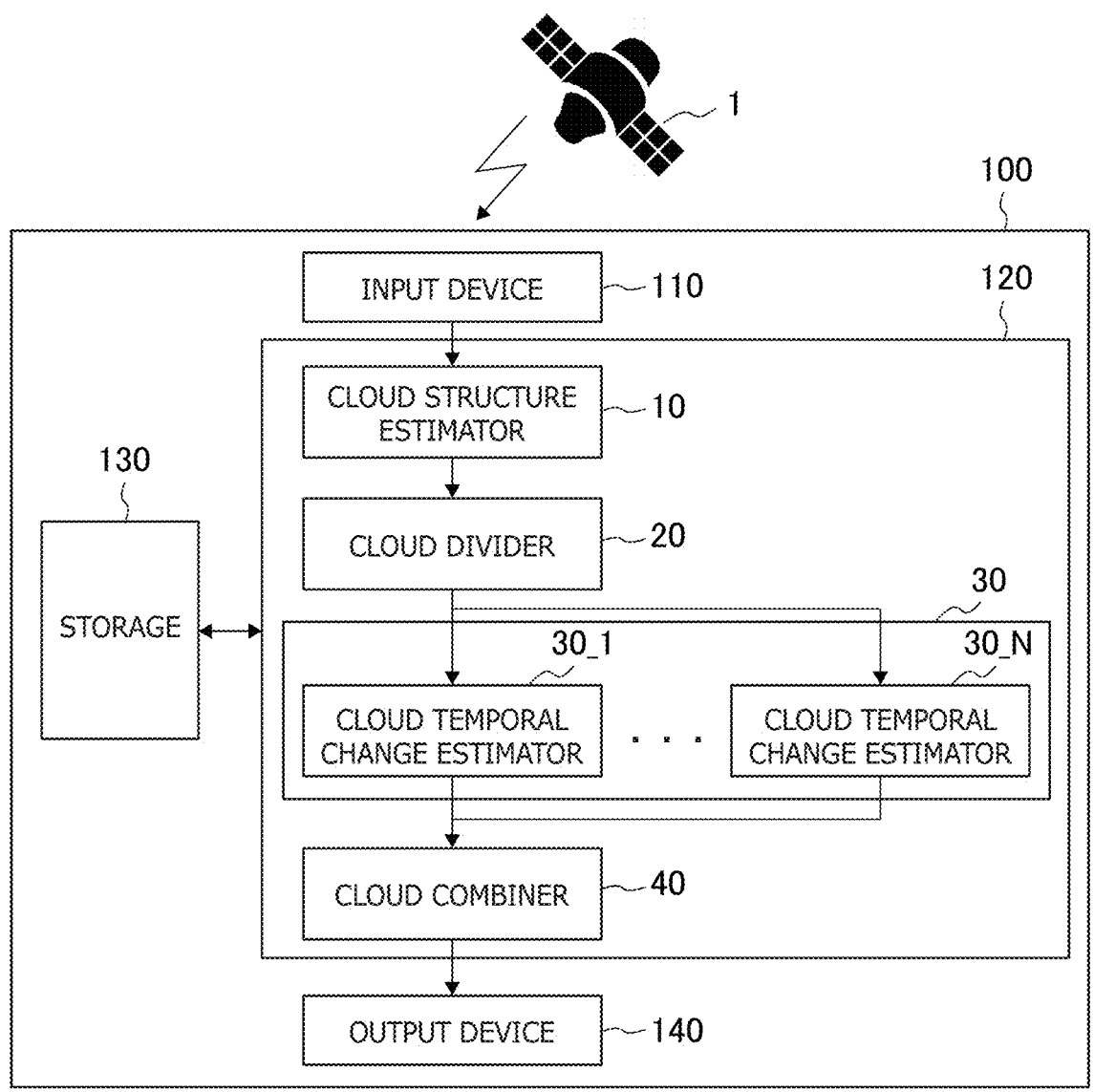
FIG. 1 is a block diagram showing an example of a cloud movement estimation apparatus functioning as an information processing apparatus according to a first embodiment.

FIG. 1 is a block diagram showing an example of a cloud movement estimation apparatus 100 (hereinafter, this apparatus 100) functioning as an information processing apparatus according to a first embodiment. This apparatus 100 concerns a technique for accurately predicting a state (for example, a position) of a cloud in future using a weather satellite image (hereinafter, satellite image) detected by a weather satellite. The satellite image is an example of data obtained by sensing the cloud. In the following explanation, the satellite image is explained in a range necessary for the explanation of this embodiment. Details of the satellite image are described in Reference Document 1 of a reference document list described at the end of this specification.

The satellite image is data acquired by sensing the cloud with a sensing apparatus included in the weather satellite. The satellite image can be roughly divided into a visible image and an infrared image. The visible image is acquired by, as an example, an imaging apparatus such as an RGB camera or a monochrome camera. The infrared image is acquired by, as an example, an infrared camera. The visible image is an image obtained by capturing reflected light of light from sunlight such as visible light or near infrared light. Therefore, reflection intensity of a cloud (if a cloud is absent, the ground surface) can be known from the visible image. The reflection intensity of the cloud is affected by the number of water droplets (cloud particles) included in the cloud, the size of the water droplets, and a nature of the water droplets (water, ice, or the like). In this embodiment, considering that the size and the nature of the cloud particles do not greatly change in a range in which the cloud advectively flows, the reflection intensity of the cloud is regarded as an amount that can be replaced with the density of the cloud particles.

The infrared image is an image obtained by capturing radiant light generated by the heat of the cloud itself. That is, the infrared image may be considered an image obtained by capturing the temperature of the cloud. The infrared image includes temperature distribution information of the cloud. The temperature of the cloud is sometimes called luminance temperature. The temperature of the cloud coincides with the temperature of the air around the cloud. A temperature profile in the vertical direction of the air can be calculated using a numerical weather model in which a motion of the air is hydrodynamically and thermodynamically treated. Therefore, the luminance temperature can be converted into height (altitude). That is, the infrared image is considered as representing the altitude of the cloud.

The weather satellite is present on a stationary orbit and photographs a hemisphere (a side of the earth seen from the satellite) or a part of the hemisphere respectively at a plurality of bands (frequencies) at a fixed time interval. A time width (a frame) for taking one image is hereinafter referred to as time frame. In this embodiment, only a visible image photographed at a certain one band and an infrared image photographed at another one band are used. For example, in the case of Himawari 8 of the Meteorological Agency, hemisphere images are respectively photographed at sixteen bands (frequencies) in total in ten minutes as one time frame. In this case, images in bands used in this embodiment are determined in advance for each of the visible image and the infrared image.

In the following explanation, a pixel of a satellite image is represented by a set (i, j) of an index. The satellite image is assumed to be a satellite image in which pixels are arranged in the directions of the longitude and the latitude and i and j respectively correspond to the longitude and the latitude. A position by a set of the latitude and the longitude is sometimes simply represented as x; x has the same meaning as (i, j) and x and (i, j) are regarded as interchangeable.

In this embodiment, a visible image and an infrared image are used as data (sensing information) detected from a region (a first region) including a cloud. However, the data is not limited to the visible image and the infrared image if the position and the height of the cloud can be detected. For example, data detected by a laser, a depth camera, or the like may be used if the position and the height of the cloud can be detected by the laser.

An input device 110 receives a satellite image from a satellite via radio. The satellite image includes a visible image and an infrared image. The input device 110 receives the satellite image in every time frame. The input device 110 provides the satellite image to a cloud structure estimator 10 (a first estimator). The input device 110 may store the received satellite image in a storage 130.

The cloud structure estimator 10 estimates, based on the satellite image, a position in the horizontal direction and a position (height) in the vertical direction of a cloud. The cloud structure estimator 10 corresponds to a first estimator that estimates at least one of position information (for example, information concerning a range in which the cloud is present) in the horizontal direction of the cloud and height information (for example, height in each position) of the cloud.

Figure 2:
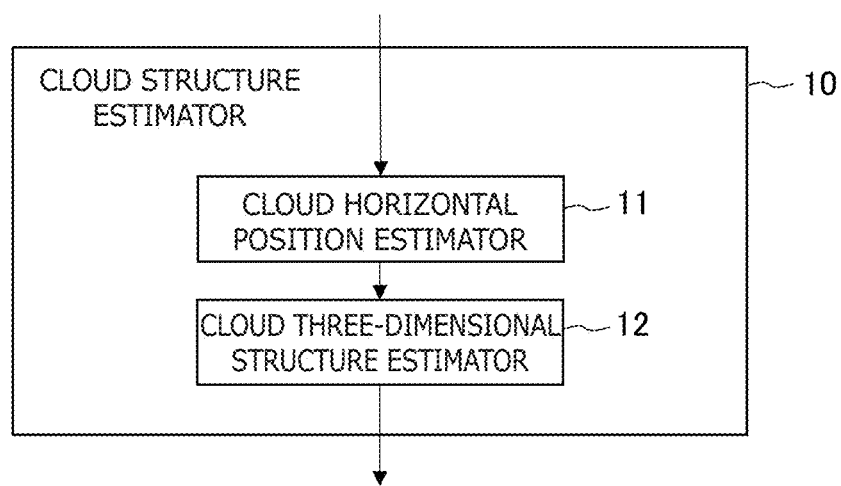
FIG. 2 is a detailed block diagram of a cloud structure estimator.

FIG. 2 is a detailed block diagram of the cloud structure estimator 10. The cloud structure estimator 10 includes a cloud horizontal position estimator 11 that estimates a position in the horizontal direction of a cloud and a cloud three-dimensional structure estimator 12 that estimates a three-dimensional structure of the cloud, that is, a position (height) in the vertical direction of the cloud for each position in the horizontal direction as a distribution of height of the cloud.

The cloud horizontal position estimator 11 specifies a pixel corresponding to the cloud in the satellite image and estimates a position corresponding to the specified pixel as the position of the cloud. For example, it is possible to determine based on reflection intensity (for example, at least one of brightness and a color), which is a pixel value of the pixel in the visible image, whether the pixel corresponds to the cloud. Besides, it is also possible to specify a pixel corresponding to the cloud using the infrared image. For example, if luminance temperature, which is a pixel value of the pixel obtained from the infrared image, is lower than the ground surface temperature, it can be determined that the cloud is reflected in the pixel. Note that a method of determining whether a certain pixel corresponds to a cloud is known as a technique called cloud mask. Various methods have been proposed besides the methods explained above. Any method may be used.

The cloud three-dimensional structure estimator 12 estimates, for a pixel determined as corresponding to the cloud by the cloud horizontal position estimator 11, a position (height) in the vertical direction of the cloud corresponding to the pixel. Luminance temperature of the pixel of the cloud obtained from the infrared image indirectly indicates the height of the cloud. Accordingly, a position (height) in the vertical direction of the cloud corresponding to the pixel can be specified based on the luminance temperature of the pixel. Conversion from the luminance temperature to the height can estimate, based on information associating a relation between temperature and height, the height corresponding to the luminance temperature as the height of the cloud. As the information associating the relation between the temperature and the height, for example, a profile in the vertical direction of the temperature obtained as a result of a numerical weather calculation can be used.

The cloud structure estimator 10 obtains the following information as a result of processing performed by the cloud horizontal position estimator 11 and the cloud three-dimensional structure estimator 12.

H(t, i, j): height of a cloud in a position corresponding to time frame t and the pixel (i, j)

A(t, i, j): reflection intensity from the cloud in the position corresponding to time frame t and the pixel (i, j)

A(t, i, j)≥0. A(t, i, j) equal to 0 or smaller than a threshold represents that a cloud is absent in the position corresponding to the pixel. A(t, i, j) larger than 0 or equal to or larger than the threshold represents that a cloud is present in the position corresponding to the pixel.

A cloud divider 20 divides the cloud in the satellite image into a plurality of levels of heights according to the heights of positions corresponding to pixels of the cloud. Even at the same latitude and longitude, a flow of the air (a wind direction and wind speed) is greatly different if altitude is different. Therefore, clouds at different levels of heights can be considered to be in different movement modes. A set of cloud pixels at the same level of height or a set of cloud pixels present at the same level of height and adjacent to one another is referred to as cloud mass image. A cloud indicated by the cloud mass image is referred to as cloud mass.

As a specific processing example, a plurality of thresholds $T_1, T_2, \ldots, T_L$ ($T_1 < T_2 < \ldots < T_L$) of the luminance temperature are set according to the number of levels (represented as L) desired to be divided. That is, a plurality of temperature ranges are set. Pixels included in the cloud are classified as follows according to luminance temperatures T of the pixels acquired from the infrared image.

$T < T_1$                  Level 1

$T_1 \leq T < T_2$                Level 2

...

$T_{L-1} \leq T < T_L$              Level L

For simplification of processing, the number L of levels desires to be divided may be set to 2. In this case, $T_1$ may be set to 273K and $T_2$ may be set to the average temperature of the ground surface. By setting $T_1$ to the freezing point of ice, it can be expected that particles are separated into a water cloud and an ice cloud. These two kinds of clouds are different in formation and a nature. Therefore, the clouds are often present in separated positions in terms of altitude.

Figure 3:
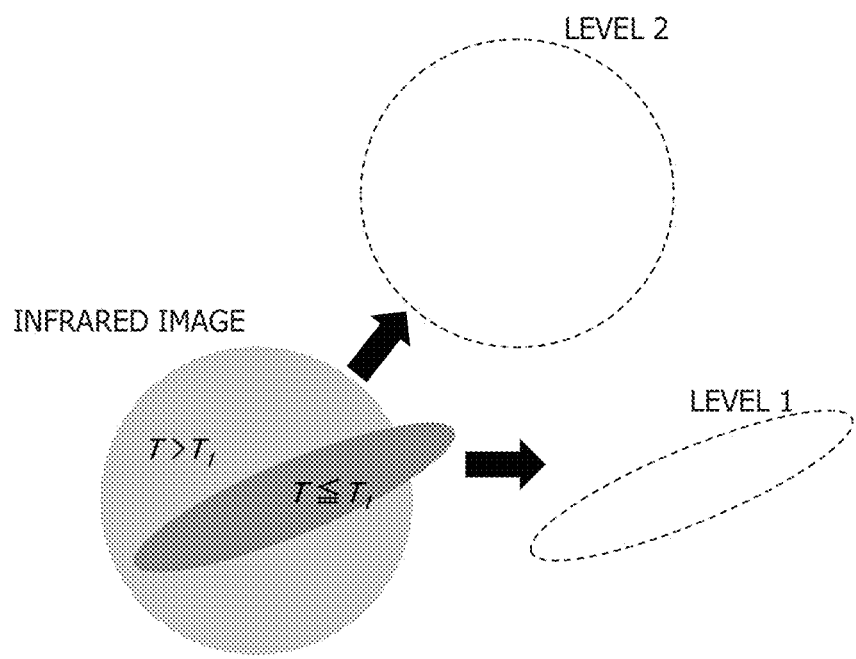
FIG. 3 is a diagram showing an example in which a cloud is divided into a plurality of cloud masses according to levels of heights by cloud divider.

FIG. 3 shows an example in which a cloud is divided into a plurality of cloud masses according to levels of heights by the cloud divider 20. In this example, a cloud under consideration is divided into two cloud masses (portions) at the level 1 at which the luminance temperature is equal to or lower than $T_1$ and at the level 2 at which the luminance temperature is higher than $T_1$. That is, the cloud under consideration is divided for each set two temperature ranges to obtain the two cloud masses (portions) obtained by dividing the cloud. Regarding that the cloud mass at the level 2 is hidden right under the cloud mass at the level 1, the cloud mass at the level 2 is specified (an operation for specifying the hidden cloud is explained in another embodiment explained below).

Depending on a type of a cloud, it is likely that an extremely large number of cloud masses (cloud mass images) are generated by dividing and processing is complicated. In order to limit the number of cloud masses, cloud masses at the same level and spatially close to one another may be treated as the same cloud mass. A threshold (represented as d) of a distance may be introduced and processing for regarding cloud masses, the distance between nearest points of which is equal to or smaller than the threshold d, as the same cloud mass may be performed.

Figure 4:
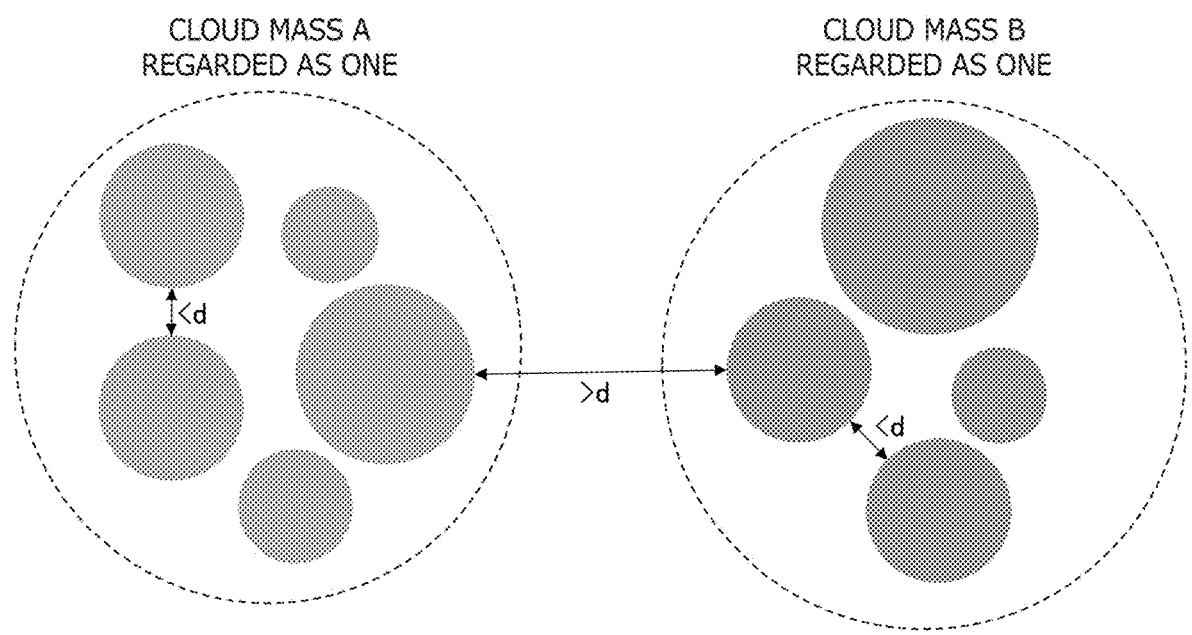
FIG. 4 is a diagram showing an example in which cloud masses, a distance between nearest points of which is equal to or smaller than a threshold, are regarded as the same cloud mass.

FIG. 4 shows an example in which the processing for regarding cloud masses, the distance between nearest points of which is equal to or smaller than the threshold d, as the same cloud mass is performed. Cloud masses at distances equal to or smaller than the threshold d are collected as one cloud mass A on the left of the figure. Cloud masses at distances equal to or smaller than the threshold d are collected as one cloud mass B on the right of the figure. Note that both of the cloud mass A and the cloud mass B are cloud masses included in the same one satellite image.

As a result of the processing, the cloud divider 20 obtains the following information.

N: the number of cloud masses
with $n \in \{1, 2, \ldots, N\}$ set as an index indicating a cloud mass $H_n(t, i, j)$: height of a cloud mass n in a position corresponding to the pixel (i, j) in the time frame t $A_n(t, i, j)$: reflection intensity of the cloud mass n in the position corresponding to the pixel (i, j) in the time frame t $A_n(t, i, j) \geq 0$. $A_n(t, i, j)$ equal to 0 or smaller than a threshold represents that the cloud mass n is absent in the position corresponding to the pixel (i, j). $A_n(t, i, j)$ larger than 0 or equal to or larger than threshold represents that the cloud mass n is present in the position corresponding to the pixel (i, j).

Note that, since the cloud masses are present only in a part of the image, $A_n$ and $H_n$ do not need to retain values for all (i, j). $A_n$ and $H_n$ may be appropriately trimmed according to positions where the cloud masses are present.

An estimation processor 30 (a second estimator) estimates a temporal change of states of individual clouds (cloud masses) acquired by the cloud divider 20. The estimation processor 30 corresponds to a second estimator that estimates states at target time of the individual cloud masses. The estimation processor 30 includes a plurality of cloud temporal change estimators 30_1 to 30_N corresponding to the individual clouds (cloud masses). When it is not particularly necessary to distinguish the cloud temporal change estimators 30_1 to 30_N, the cloud temporal change estimators 30_1 to 30_N are described as cloud temporal change estimators 30. The cloud temporal change estimators 30 estimate, independently from one another, temporal changes in states (in this embodiment, positions) of the cloud (the cloud masses) corresponding thereto. The temporal changes in the positions of the cloud correspond to the cloud being flowed by wind (called advection). As the temporal changes of the clouds, there are development, attenuation, and the like of the clouds other than the advection. These will be explained in a fifth embodiment.

Figure 5:
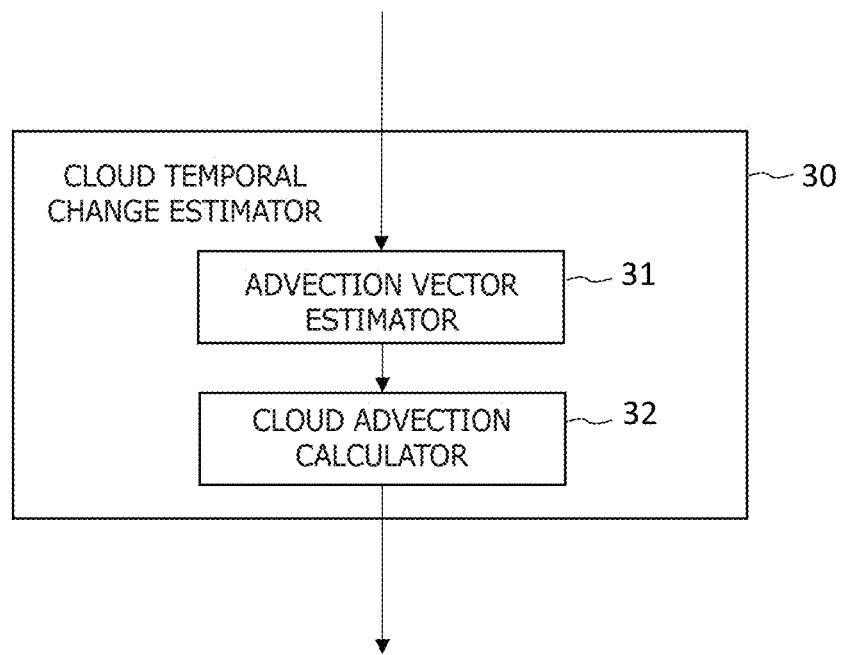
FIG. 5 is a block diagram showing an example of a cloud temporal change estimator.

FIG. 5 is a block diagram showing an example of the cloud temporal change estimator 30. The cloud temporal change estimator 30 includes an advection vector estimator 31 and an advection calculator 32.

The advection vector estimator 31 estimates a vector representing moving speed (speed and a direction) of a cloud (a cloud mass) from images in a continuous time frames. This vector is referred to as advection vector or movement vector. A time interval (a lead time) of the estimation may be the same time interval as the time frame, may be a time interval shorter than the time frame, or may be a time interval longer than the time frame. For a (present) time frame under consideration, the estimation is performed at time (target time) for each lead time after the time in the time frame. In the next and subsequent time frames (a satellite image in the next time frame is not received yet), the estimation is continuously performed independently from estimation for the next time frame. That is, after the satellite image in the next time frame is received, the estimation of the advection vector for the present time frame is continuously performed for each lead time. The estimation for the next time frame is performed in the same manner independently from the present time frame.

As an estimation example of the advection vector, a vector between positions of a cloud (a cloud mass) in two time frames, that is, a vector between a position of the cloud (the cloud mass) in the immediately preceding time frame and a position of the cloud (the cloud mass) in the present time frame may be set as the advection vector. As the position of the cloud (the cloud mass), for example, the center of gravity position of the cloud is used.

Figure 6A:
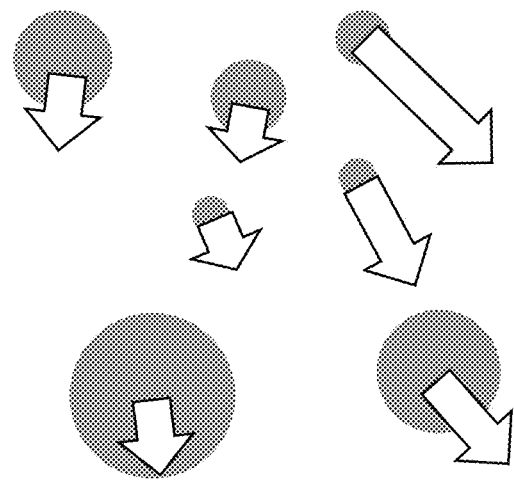
FIG. 6A is a diagram showing an example in which an advection vector is estimated for a plurality of cloud masses in a present time frame.

FIG. 6A shows an example in which an advection vector is estimated for a plurality of cloud masses in the present time frame.

As another estimation method for an advection vector, a technique (translation optimization) for estimating an advection vector can be used by translating temporally preceding and following images and finding a position where an overlapping area is maximized (see Non-Patent Literature 1). About the translation optimization, please refer to explanation referring to FIG. 6B below.

There is also a method of applying a technique called optical flow for grasping a movement of an object from temporally continuous images with image processing (see Reference Document 2). In this case, for example, an optical flow of a cloud (a cloud mass) is calculated for two or more time frames and an advection vector is calculated based on a change in a position of the cloud (the cloud mass) along the optical flow. The optical flow provides technically high sophistication such as in contrivance in calculation efficiency and measures against various changes of a scale of an object under consideration. A basic idea is the same as the translation optimization.

An advection vector in a position where a cloud (a cloud mass) is absent may be calculated by spatial interpolation based on a position or an advection vector of a visible cloud (cloud mass). As a method of the interpolation, a kernel spline method may be used. This method is a method of, when values are given to a plurality of points not spatially arrayed in a lattice shape, calculating a value at a point other than the plurality of points with interpolation (Reference Document 3). When advection vectors are given to positions of cloud masses, an advection vector in a position where a cloud (a cloud mass) is absent can be supplemented by the kernel spline method for latitude direction and longitude direction components independently from one another. By calculating the advection vector in the position where a cloud (a cloud mass) is absent in this way, it is possible to more accurately estimate an advection (estimate a temporal change of a position) of a cloud (a cloud mass).

Figure 7:
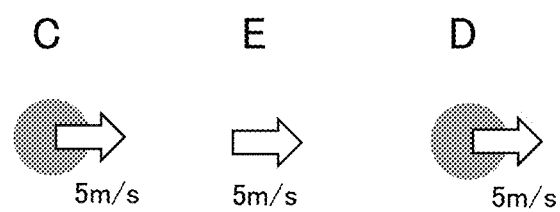
FIG. 7 is a diagram showing an example in which an advection vector is estimated, by interpolation, for a position where a cloud mass is absent.

FIG. 7 shows an example in which an advection vector is estimated by interpolation for a position where a cloud mass is absent. An average of an advection vector of a cloud mass C and an advection vector of a cloud mass D is adopted for a position E between the cloud mass C and the cloud mass D.

In the related art, the height of a cloud (a cloud mass) is not considered in advection estimation for the cloud and two-dimensional image processing is performed. That is, the cloud being three-dimensionally disposed in the vertical direction and, in some case, overlapping is not considered. Therefore, when clouds at different heights are present to overlap and respectively have different advection vectors, advections (temporal changes of positions) of the clouds cannot be properly estimated. In this embodiment, an advection vector is calculated for each of clouds (cloud masses) at different levels of heights. Therefore, an advection of the cloud can be properly estimated by an advection calculator 32 explained below.

In the related art, an advection vector in a position where a cloud is absent cannot be considered. If a region to be translated is narrowed to a certain degree in the translation optimization (see FIG. 6B), an advection vector of a cloud mass can be accurately estimated. However, an estimation value of an advection vector for a position outside the region is 0.

Figure 8:
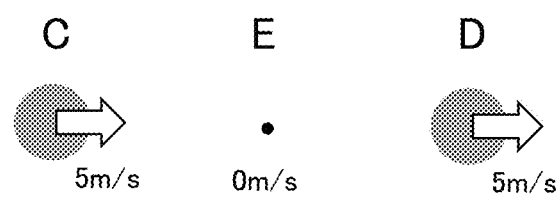
FIG. 8 is a diagram showing an example in which, in related art, an estimation value of an advection vector is calculated as 0 for a position where a cloud mass is absent.

FIG. 8 shows an example in which, in the related art, an estimation value of an advection vector is calculated as 0 for a position C where a cloud mass is absent.

Considering that an advection (movement of a cloud) is caused by wind, even in a position where a cloud mass is absent, if wind blows, an advection vector in the position is not 0 and has to be correctly estimated. This is because, if the advection vector is not correctly estimated, when another cloud moves to the position, the cloud does not move from the position.

In the translation optimization explained above, if the region to be translated is widened, all values of advection vectors are the same in the region. The problem of the advection vector being 0 can be reduced.

Figure 6B:
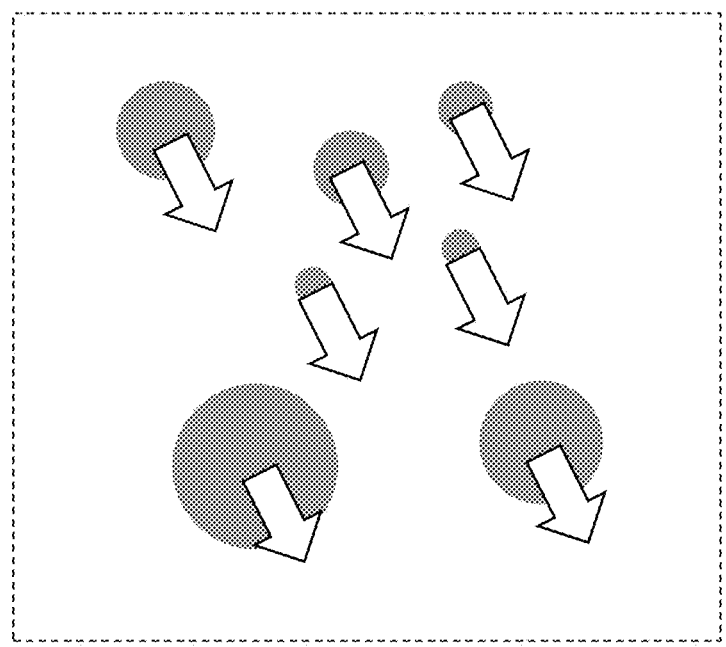
FIG. 6B is a diagram showing an example in which a region to be translated is widened and an advection vector is estimated.

FIG. 6B shows an example in which the region to be translated is widened and an advection vector is estimated. Cloud masses belonging to a set region are regarded as having the same advection vector. As a result, an advection vector in a position (a space) where a cloud mass is absent is also estimated.

However, if the region to be translated is widened, a difference among advection vectors of individual cloud masses and the like inside the region (see FIG. 6A) is overlooked and estimation accuracy for movements of the cloud masses is deteriorated. This problem occurs because spatial positions of clouds and a gap between the clouds cannot be distinguished and treated.

In this embodiment, even when an advection vector is calculated using the translation optimization, since an advection vector in a position where a cloud is absent is also calculated by interpolation (see FIG. 7), an advection of a cloud can be accurately estimated.

The advection calculator 32 calculates a temporal change (an advection) of a position of a cloud as a temporal change of a state of the cloud (a cloud mass) using an advection vector estimated by the advection vector estimator 31. As a simple method, a temporal change of a position of a cloud (a cloud mass) is calculated assuming that the cloud (the cloud mass) continues to move, that is, the cloud (the cloud mass) continues to move in the same direction according to the advection vector. A method of calculating a state in which a density distribution of particles present in fluid changes according to a flow of the fluid (a method of advection calculation traditionally treated in the field of hydrodynamics) may be applied to a satellite image to calculate temporal development of the density of cloud particles to calculate a temporal change of a position of a cloud (a cloud mass) (see Reference Document 6). In this case, it is possible to perform accurate calculation by using the advection vector in the position where a cloud is absent explained above. Since reflection intensity also changes when the density of the cloud particles of the cloud (the cloud mass) changes after the advection, reflection intensity after the change can also be estimated.

As a result of the processing, the cloud temporal change estimator 30 (the advection vector estimator 31 and the advection calculator 32) obtains the following information for a cloud mass n with τ set as a lead time of the estimation.

$H'_n(t, \tau, i, j)$: Height of the cloud mass n in a position corresponding to the pixel (i, j) in estimation of the lead time τ (time t+τ) in the time frame t (in estimation of an advection vector, assuming that the height does not change, only a horizontal direction component may be calculated; in this case, a value of the height may be fixed)

$A'_n(t, \tau, i, j)$: Reflection intensity of the cloud mass n in the position corresponding to the pixel (i, j) in the estimation of the lead time τ (time t+τ) in the time frame t (it may be assumed that the reflection intensity does not change before and after an advection; in this case, a value of the reflection intensity is fixed)

$A'_n(t, \tau, i, j) \geq 0$. $A'_n(t, \tau, i, j)$ equal to 0 or smaller than a threshold represents that a cloud of the cloud mass n is absent in the position corresponding to the pixel (i, j). $A'_n(t, \tau, i, j)$ larger than 0 or larger than the threshold represents that the cloud of the cloud mass n is present in the position corresponding to the pixel (i, j).

A cloud combiner 40 acquires, as cloud information of clouds after movement, a set of information concerning positions and heights of the clouds (cloud masses) estimated by the cloud temporal change estimator 30. For example, the cloud information of the clouds after movement includes the information ($H'_n(t, \tau, i, j)$ and $A'_n(t, \tau, i, j)$) for the cloud masses n obtained by the cloud temporal change estimator 30. The cloud information is obtained for time (target time) for each lead time in the present time frame. The cloud information is considered to represent a three-dimensional structure of the clouds at the target time.

The cloud combiner 40 may reconfigure a visible image from the calculated three-dimensional structure of the clouds. That is, when it is assumed that the calculated three-dimensional structure of the clouds is present, a visible image that will be acquired by the satellite may be acquired by estimation or calculation for the structure. For this purpose, an image including information concerning reflection intensities in positions only has to be generated as a reconfigured image. Specifically, when a cloud mass is absent in a target position, cloud reflection intensity in that position is set to 0. When only one cloud mass is present, reflection intensity of the cloud mass is set as reflection intensity ($A'_n(t, \tau, i, j)$) of the position. When a plurality of cloud masses overlap in the target position, reflection intensity can be calculated as follows.

Figure 9:
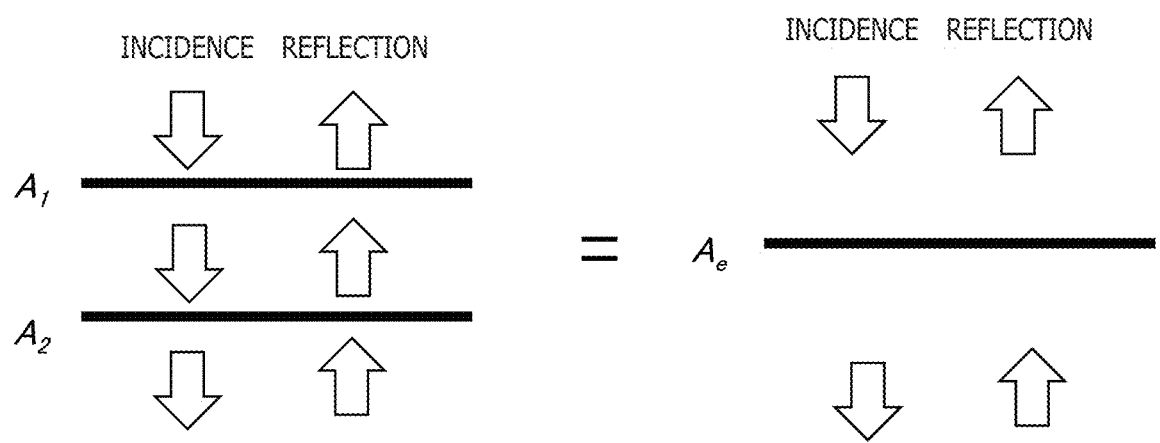
FIG. 9 is a diagram for explaining a calculation example for reflection intensity in the case in which a plurality of cloud masses overlap.

FIG. 9 is a diagram for explaining a calculation example of reflection intensity in the case in which a plurality of cloud masses overlap. It is assumed that clouds (cloud masses), reflection intensities of which are respectively $A_1$ and $A_2$, are present in an upper layer and a lower layer. At this time, upward light reflected by the cloud in the lower layer is sometimes reflected by the cloud in the upper layer again. Accordingly, a process of the reflection is slightly complicated. The reflection by the two clouds is equivalent to reflection intensity $A_e$ given by the following expression.

[Expression 1]

$$A_e = \frac{A_1 + A_2 - 2A_1 A_2}{1 - A_1 A_2} \quad (1)$$

When three or more cloud masses overlap, reflection intensity can be calculated by repeatedly applying Expression (1).

As a result of the processing, the following information is obtained as a reconfigured image.

Figure 10:
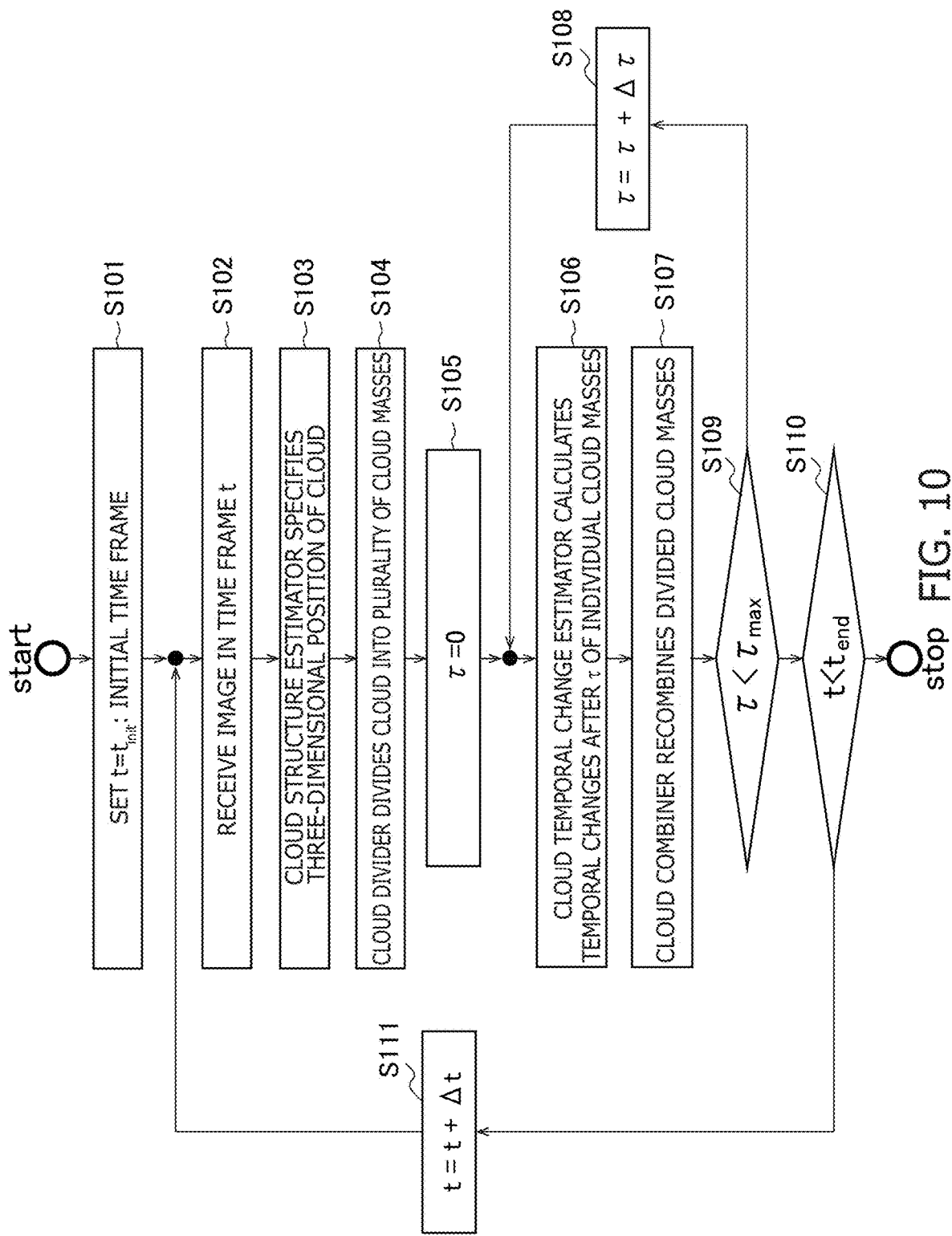
FIG. 10 is a flowchart of an example of processing according to the first embodiment.

$A'(t, \tau, i, j)$: reflection intensity in a position equivalent to the pixel (i, j) in estimation of the lead time τ (time t+τ) in the time frame t FIG. 10 is a flowchart of an example of processing according to the first embodiment.

First, an initial time frame tint is set as the time frame t (S101). It is assumed that, at this point in time, an image in the immediately preceding time frame is already acquired.

The input device 110 receives a satellite image (sensing information of a region including a cloud) in the time frame t (S102).

The cloud structure estimator 10 estimates, based on the satellite image, a position where the cloud is present and height (a three-dimensional position of the cloud) for each position (S103).

The cloud divider 20 divides the cloud into a plurality of cloud masses (portions) according to the height of the cloud for each position (a distribution of the height of the cloud) (S104).

The lead time τ is set to 0 (S105).

The cloud temporal change estimator 30 calculates temporal changes of states (in this example, temporal changes of positions) of the individual cloud masses, that is, positions after the lead time τ (S106).

The cloud combiner 40 obtains, as output information, a set of information concerning the cloud masses in an estimated position (a three-dimensional position) (S107). The cloud combiner 40 generates an image (a visualized image) obtained by recombining the cloud masses in the estimated position (S107).

At is added to τ (S108). Steps S106 to S108 are repeated until t reaches a maximum value $\tau_{max}$ (S109). At represents a time interval at which advection estimation is performed.

At is added to t (S111). Steps S101 to S109 are repeated until t reaches end time (represented as tend) (S110). At is a time frame interval of a satellite image. For example, in the case of a hemisphere image of Himawari 8, Δt is ten minutes.

The time interval Δτ of the advection estimation may be determined independently from the time frame interval Δt. However, if Δτ=Δt (or Δτ=Δt/m: m is an integer), a satellite image for the same time as time when the advection estimation is performed is obtained. Therefore, there is an advantage that, for example, it is easy to improve accuracy of the advection estimation.

Figure 11:
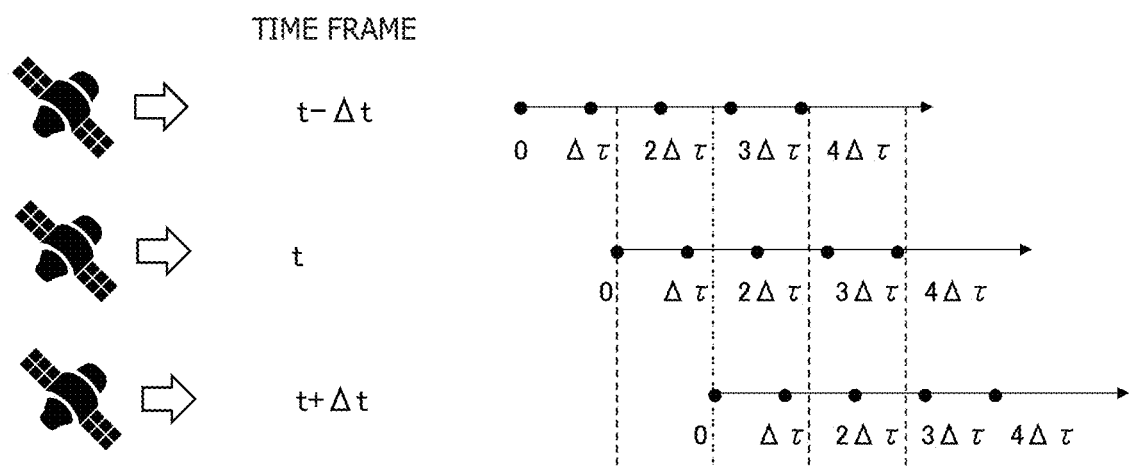
FIG. 11 is a diagram showing a state in which advection estimation for a cloud is performed at every time $\Delta\tau$ for each time frame.

FIG. 11 shows a state in which a satellite image (a visualized image and an infrared image) is input in each time frame and advection estimation for a cloud is performed in each time frame at each time Δτ. Here, Δτ=Δt. An advection estimation result after the lead time Δτ performed in a time frame t−Δt corresponds to a state of a cloud at a lead time 0 of the time frame t as indicated by a vertical dotted line.

As explained above, according to this embodiment, a cloud is divided into a plurality of portions at different levels of heights based on a satellite image and a temporal change in the position of the cloud is estimated for each of the portions. Consequently, it is possible to improve cloud position calculation accuracy.

Second Embodiment

In the case of one cloud sharing the same nature, even if levels (altitudes) of heights fluctuate in respective portions in the cloud, it is preferable to treat these portions as the same cloud (cloud mass) without dividing the portions. Alternatively, conversely, even at the same luminance temperature, in the case of a cloud including a plurality of portions having different natures, it is preferable to treat the portions as separate clouds (cloud masses). In a second embodiment, when a cloud includes a plurality of portions having different natures, even if the portions are at the same level of height, dividing of the cloud into a plurality of clouds is realized. The clouds having the different natures sometimes appear as a difference in texture (pattern) in an image. Therefore, in this embodiment, a cloud is divided using the difference in the texture.

Figure 12:
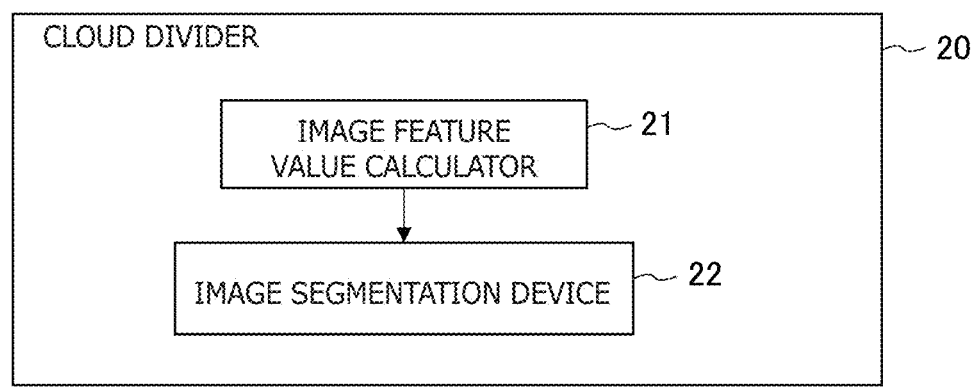
FIG. 12 is a block diagram of an example of a cloud divider according to a second embodiment.

FIG. 12 is a block diagram of an example of the cloud divider 20 according to the second embodiment. The other components are the same as the components in the first embodiment. The cloud divider 20 includes an image feature value calculator 21 and an image segmentation device 22.

The image feature value calculator 21 calculates, for each of pixels of a satellite image (an infrared image), which is a captured image of a region including a cloud, one or more feature values based on a luminance temperature of the pixel and a luminance temperature of a peripheral pixel. As the feature value, GLCM (see Reference Document 4) or the like is widely known. In this embodiment as well, the GLCM can be used.

The image segmentation device 22 maps feature values of the pixels in a feature value space, determines similarity among the pixels based on distances among coordinates (points) representing the feature values, and performs clustering of the pixels. A set of the pixels corresponding to generated clusters corresponds to an image of cloud masses. As an example of the clustering, there is a method of integrating pixels in the same cluster in order from pixels at the closest distance (see Reference Document 5).

Figure 13:
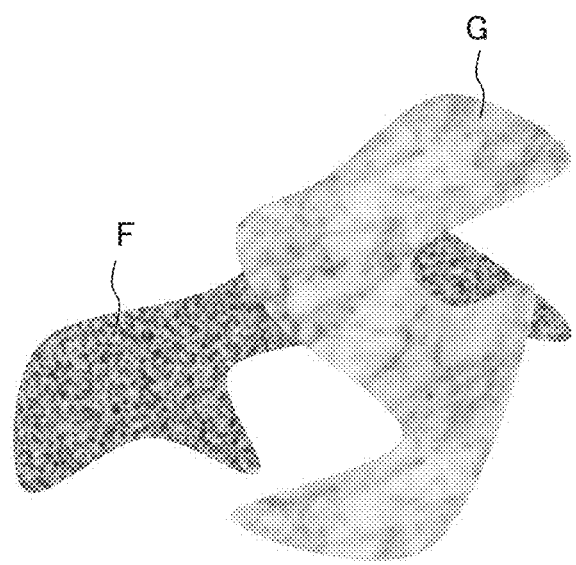
FIG. 13 is a diagram showing an example in which a cloud (a cloud image) present as the same level of height as a whole is divided into a plurality of cloud masses.

FIG. 13 shows an example in which a cloud (a cloud image) at the same level of height as a whole is divided into a plurality of cloud masses. The cloud is divided into a region (a cluster) F and a region (a cluster) G by clustering. A change pattern (a texture) of brightness and darkness in the cluster F is uniform. A change pattern (a texture) of brightness and darkness in the cluster G is also uniform. However, contents of the textures are different between the region F and the region G. Accordingly, the cluster F represents one cloud mass and the cluster G represents another one cloud mass. In this way, the cluster F and the cluster G are close or overlap and have the same level of height. However, the cluster F and the cluster G can be treated as separate cloud masses making use of the difference between the textures.

As explained above, according to this embodiment, it is possible to perform accurate advection estimation by dividing a cloud mass at the same level of height into a plurality of cloud masses.

Third Embodiment

A new function of estimating a cloud in a lower layer invisible in an image because the cloud is hidden behind a cloud present in an upper layer is added to the cloud divider 20.

Figure 14A:
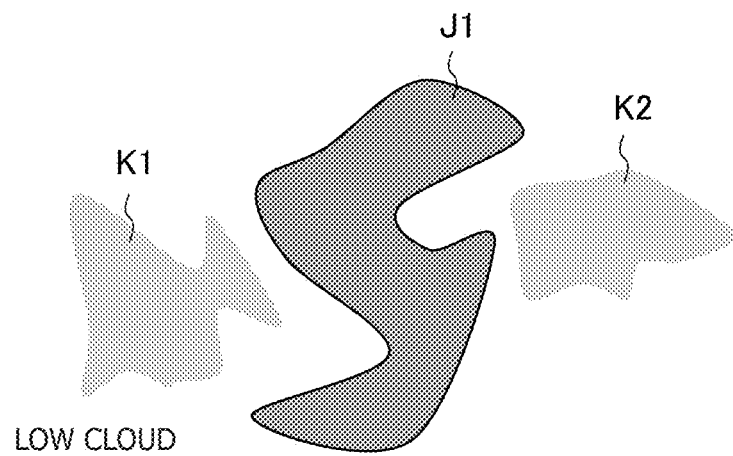
FIGS. 14A and 14B are diagrams showing an idea of estimation of a hidden cloud.
Figure 14B:
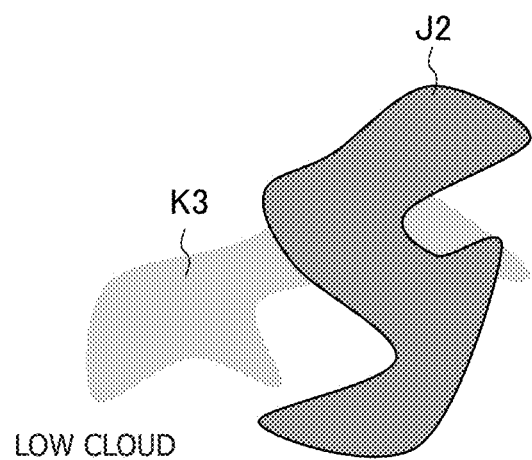

FIGS. 14A and 14B show an idea for estimating a hidden cloud in this embodiment. FIG. 14A shows a cloud 31 at a high level (in a high layer) and clouds K1 and K2 at a low level (in a low layer). The cloud 31 is separated from the clouds K1 and K2. That is, no other clouds are adjacent to the cloud 31. In this case, it is likely to estimate that no other clouds are absent under the cloud 31 in the high layer. On the other hand, FIG. 14B shows a cloud 32 at a high level (in a high layer) and a cloud K3 at a low level (in a low layer). The cloud K3 in the low layer is adjacent to the cloud 32 in the high layer. In this case, it is likely to estimate that the cloud K3 in the low layer is present under the cloud 32 in the high layer as well. That is, a basic idea for estimating a cloud in a hidden portion is to determine, based on a statistical model indicating in what kinds of a shape the cloud spreads, whether it is likely to consider that a cloud is present in the hidden portion or it is likely to consider that a cloud is absent in the hidden portion.

Figure 15:
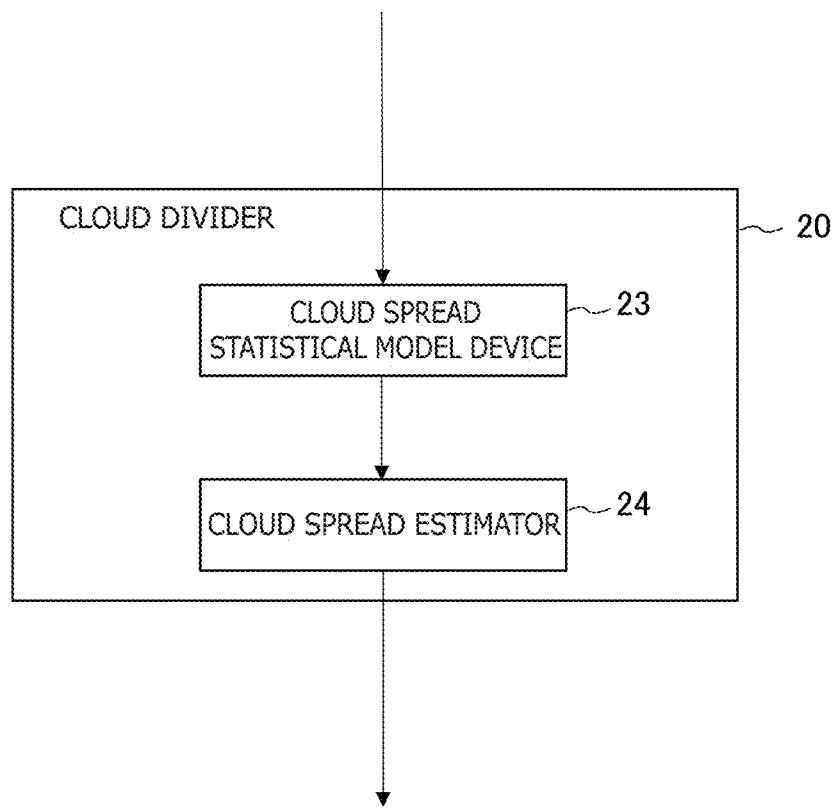
FIG. 15 is a block diagram of an example of a cloud divider in a third embodiment.

FIG. 15 is a block diagram of an example of the cloud divider 20 in this embodiment. The cloud divider 20 includes a cloud spread statistical model device 23 and a cloud spread estimator 24.

The cloud spread statistical model device 23 sets a statistical model of cloud spread. The statistical model is stored in the storage 130. The cloud spread statistical model device 23 reads the statistical model from the storage 130. Here, as the statistical model, a Markov random field model, which is a probability model, is set as the statistical model (see Reference Document 7). The Markov random field model is a model often used in an image analysis.

Figures 16A, 16B:
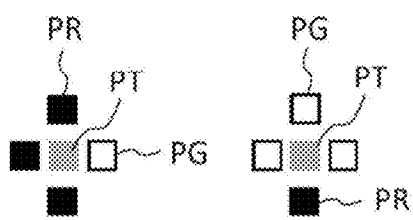
FIGS. 16A to 16C are diagrams for explaining a Markov random field model.
Figure 16C:
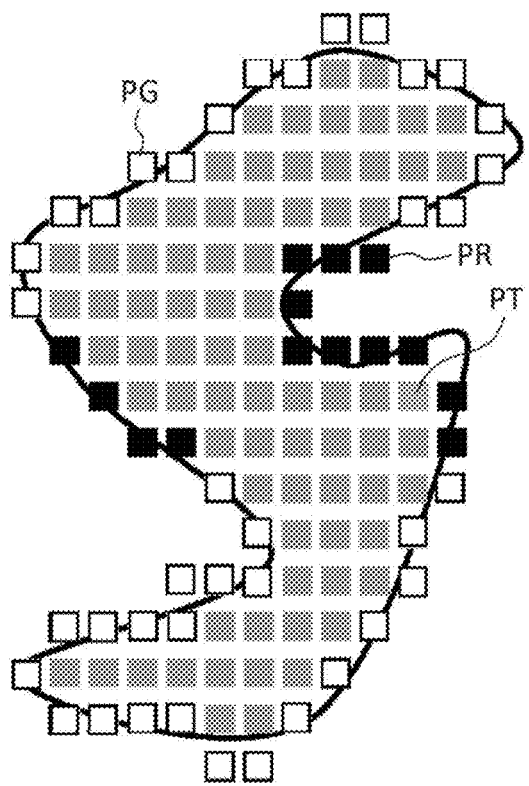

FIGS. 16A to 16C are diagrams for explaining the Markov random field model. A pixel including a cloud is represented as a pixel PR, a pixel without a cloud is represented as a pixel PG, and a pixel (a target pixel) for which presence or absence of a cloud is desired to be determined is represented as a pixel PT. In the Markov random field model, a probability of a cloud being present in a certain pixel is determined according to presence or absence of a cloud in an adjacent pixel. For example, as shown in FIG. 16A, if many pixels PR including clouds are present around the target pixel PT, it is considered that a probability of a cloud being also present in the target pixel PT is high. Conversely, as shown in FIG. 16B, if few pixels PR including clouds are present around the target pixel PT, the probability of a cloud being present in the target pixel PT is low. In this way, a model for setting a presence probability of a cloud in the target pixel PT to be determined according to presence or absence of a cloud in an adjacent pixel is the Markov random field model.

A region of a portion hidden under a cloud (a cloud mass) in a high layer is set as a target region for estimating whether a cloud in a lower layer (another cloud or another cloud mass) is present in the region. Pixels included in the target region are represented by a set (i, j) of integers as the target pixels PT. A variable representing whether a cloud is present in the pixel (i, j) included in the target region is represented as follows. The variable is a variable of a probability model and is subjected to probabilistic estimation.

$$a_{i,j} = 0, \text{ a cloud is absent in } (i, j)$$
$$= 1, \text{ a cloud is present in } (i, j)$$

In a boundary region with the periphery of the target region, it is known whether a lower layer cloud is present. A pixel included in the boundary region is represented by an integer k. Whether a cloud is present in the pixel included in the boundary region is represented by the following.

$$b_k = 0, \text{ a cloud is absent in } (k)$$
$$= 1, \text{ a cloud is present in } (k)$$

In the above, bk is uniquely decided from a satellite image. As an example, in FIG. 16C, the target pixel PT for estimating presence or absence of a low cloud in a region present under a high cloud in FIG. 14B is shown. In the boundary region, a pixel PG ($b_k=0$) without a low cloud and a pixel PR ($b_k=1$) including a low cloud are shown.

According to the Markov random field model, presence or absence of a cloud in the target region is given by a set of variables indicated by the following Expression (2).

[Expression 2]

$$a=\{a_{1,j}:(i,j) \text{ all pixels in the target region}\} \quad (2)$$

A probability model (a statistical model) is given by, for example, the following expression based on the set of the variables.

[Expression 3]

$$p(a) \sim \exp\left\{-Y\sum_{i,j}\left[(a_{i,j}-a_{i,j+1})^2 + (a_{i,j}-a_{i+1,j})^2 + \sum_{k \text{ in neighbor}(i,j)}(a_{i,j}-b_k)^2\right]\right\} \quad (3)$$

where, $\gamma$ ($\geq 0$) is a parameter of a statistical model representing strength of a probability of a cloud being present in an adjacent pixel and is determined in advance by, for example, being applied to data in the past.

The cloud spread estimator 24 estimates, based on a range adjacent to another cloud mass (another portion) adjacent to a first portion in a boundary of a first cloud mass (a first portion) among a plurality of cloud masses (portions), whether another cloud is present in a lower layer under the first cloud mass (the first portion) or a range of another cloud present in the lower layer.

More specifically, the cloud spread estimator 24 estimates, based on the probability model (see Expression (3)) set by the cloud spread statistical model device 23, whether clouds are present in the pixels PT in the target region. A method of estimating a value of a variable included in the probability model may be any method. However, as a simple method, there is MAP (Maximum a posteriori) estimation. A formula of the MAP estimation is described below.

[Expression 4]

$$\hat{a} = \underset{a}{\operatorname{argmax}} p(a) \quad (4)$$

When the MAP estimation is performed, a value of a variable included in the probability model is estimated to maximize or quasi-maximize Expression (3).

The cloud spread estimator 24 integrates a cloud in a lower layer estimated as being present in the target region (a region hidden by a cloud in an upper layer) with a low cloud (the cloud K3) in FIG. 14B.

As explained above, according to this embodiment, it is possible to detect another cloud hidden by the cloud in the high layer.

Fourth Embodiment

It is estimated by a method different from the method in the third embodiment whether a cloud in a low layer is present in a region hidden by a cloud in a high layer. A function for the estimation is added to the cloud divider 20.

Figure 17:
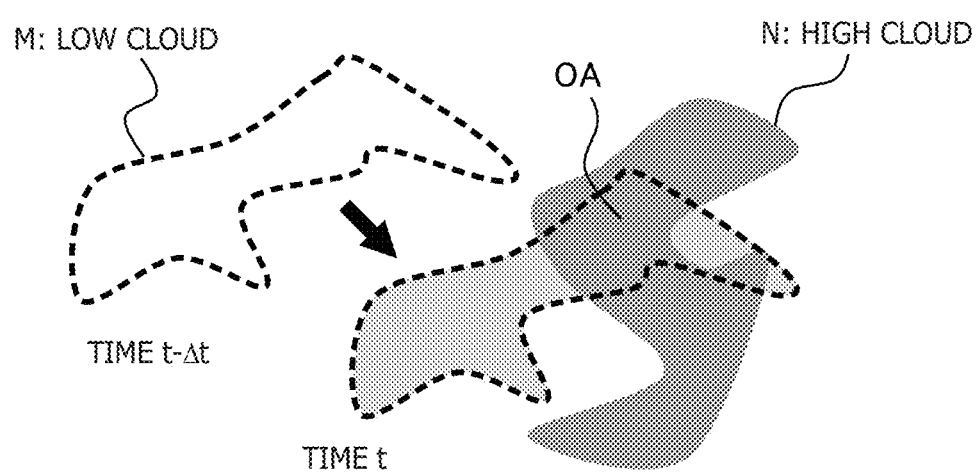
FIG. 17 is a diagram for explaining an overview of a fourth embodiment.

FIG. 17 is a diagram for explaining an overview of a fourth embodiment. When a cloud in a lower layer moves and a part or the entire cloud in the lower layer is hidden by a cloud in an upper layer or the cloud in the upper layer moves and hides a part or the entire cloud in the lower layer, presence or absence of a hidden cloud can be estimated from an image at the preceding time. A part OA of a low cloud M present in a separated position in a time frame (t−Δt) enters under a high cloud N in a present time frame t. In the first to third embodiments, a position of a cloud in the present time frame t is estimated from a satellite image in the immediately preceding time frame (t−Δt) based on the advection calculation. However, in the fourth embodiment, presence or absence of a cloud hidden by a cloud in an upper layer is estimated using the advection calculation.

Figure 18:
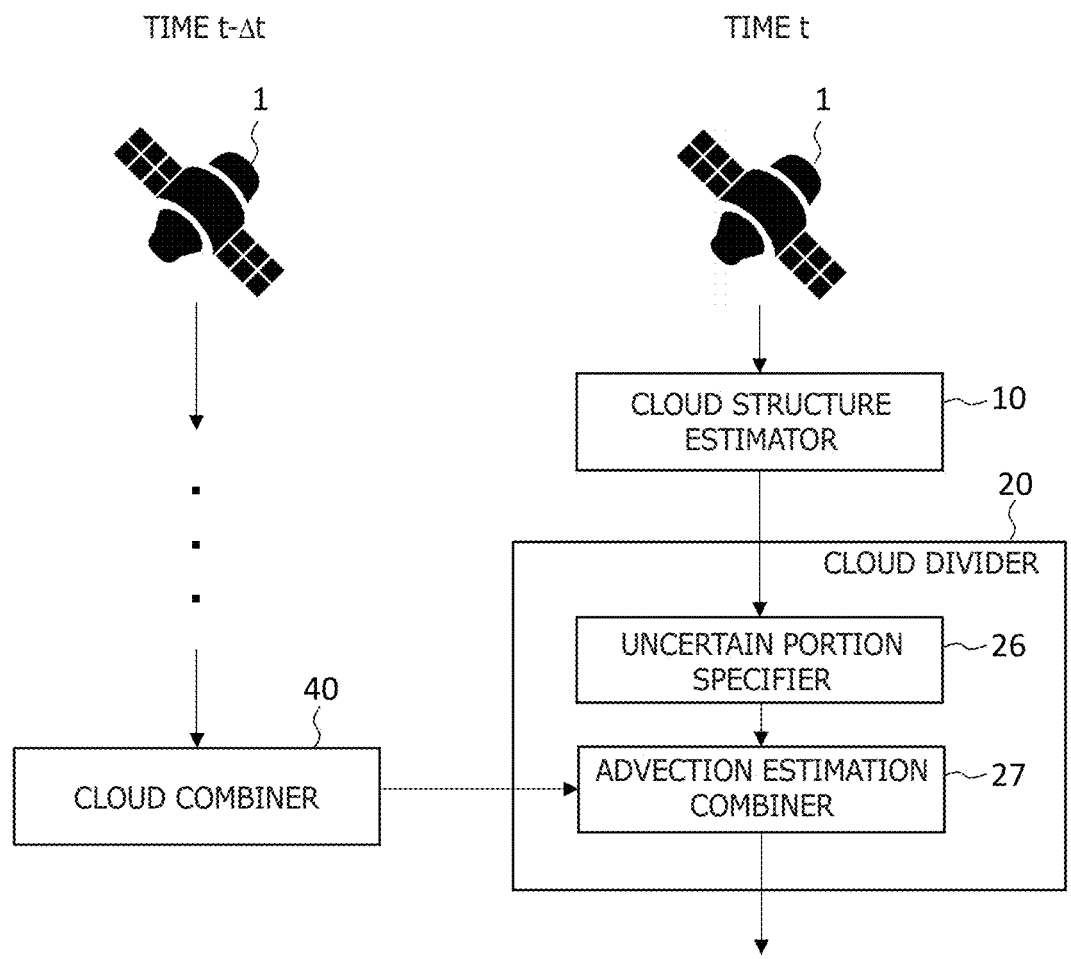
FIG. 18 is a block diagram of an example of a cloud divider according to the fourth embodiment.

FIG. 18 is a block diagram of an example of the cloud divider 20 according to this embodiment. The cloud divider 20 includes an uncertain portion specifier 26 and an advection estimation combiner 27.

The uncertain portion specifier 26 specifies a pixel (a target pixel) in which a cloud in a lower layer is hidden by a cloud in an upper layer and presence or absence of the cloud in the lower layer is unknown. Since a pixel in a region hidden by the cloud in the upper layer corresponds to the target pixel, the uncertain portion specifier 26 designates a region where a cloud is present in a satellite image as an undecided region. The uncertain portion specifier 26 sets a pixel included in the undecided region as a target pixel and acquires altitude (a luminance temperature) of a cloud in the target pixel.

The advection estimation combiner 27 estimates, based on a result of the advection calculation for each of cloud masses (portions of the cloud) estimated based on a satellite image in the preceding time frame t−Δt, whether another cloud is present (or a range of presence of another cloud) in a lower layer under a plurality of cloud masses obtained based on a satellite image in the present time frame t. As an example, t−Δt corresponds to first time. As an example, t corresponds to second time later than the first time.

More specifically, the advection estimation combiner 27 acquires, out of a result of the advection calculation obtained in the preceding time frame t−Δt, information (a three-dimensional position or a three-dimensional structure) of a cloud corresponding to the present time frame t. The advection estimation combiner 27 determines, based on the acquired information, a cloud having altitude lower than (having height level lower than) a cloud seen in the satellite image in the present time frame is present in positions of pixels (target pixels) included in the undecided region. Upon determining that a cloud having low altitude is present, the advection estimation combiner 27 regards that a cloud at altitude having a low height level is present in the positions of the target pixels in the present time frame t. The advection estimation combiner 27 integrates the cloud regarded as being present with a cloud having a low height level seen adjacent to the cloud at the altitude having the high height level in the time frame t.

As explained above, according to this embodiment, it is possible to detect another cloud hidden by a cloud in a high layer.

Fifth Embodiment

A cloud such as a cumulonimbus cloud is generated and the cloud sometimes rapidly develops because of a reason such as an ascending air current. ON the other hand, when a cloud formed in a region where water vapor is oversaturated moves to a place where a saturation degree of water vapor is small, the cloud is attenuated. Such a change of the cloud can be understood that the cloud disappears on an image. In the first embodiment, the temporal change of the position is estimated as the temporal change of the state of the cloud. However, in a fifth embodiment, development and attenuation of a cloud are estimated in addition to the temporal change of the position.

Figure 19:
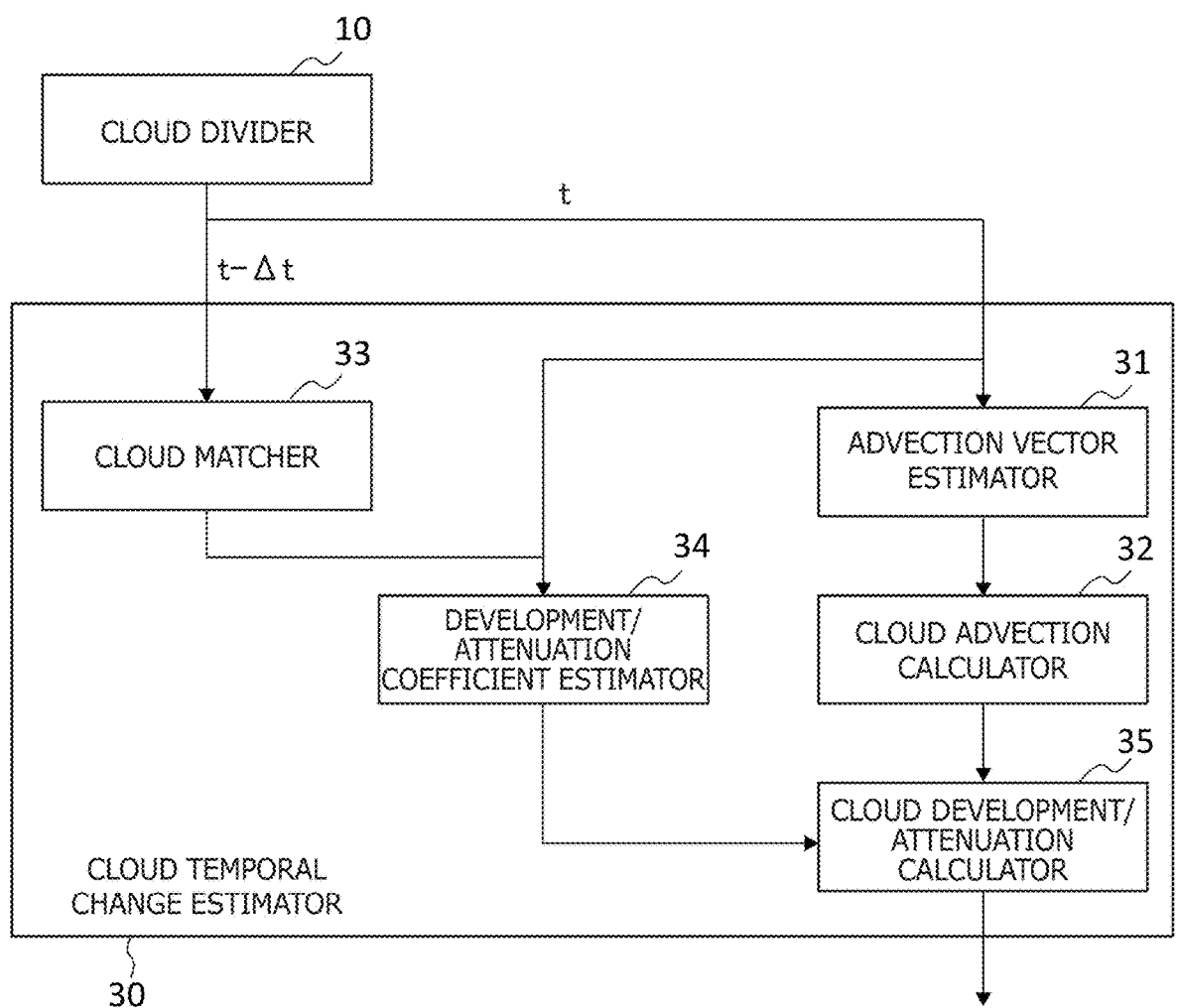
FIG. 19 is a block diagram of an example of a cloud temporal change estimator according to a fifth embodiment.

FIG. 19 is a block diagram of an example of the cloud temporal change estimator 30 according to this embodiment. In the cloud temporal change estimator 30 shown in FIG. 19, a cloud matcher 33, a development/attenuation coefficient estimator 34, and a cloud development/attenuation calculator 35 are added to the cloud temporal change estimator 30 in the first embodiment. Based on a difference between a development state of each cloud mass (portion of a cloud) based on a satellite image in the immediately preceding time frame t−Δt and a development state of each cloud mass based on a satellite image in the present time frame t, the cloud temporal change estimator 30 estimates a temporal change of a development state of a cloud of each cloud mass based on the satellite image in the present time frame t. That is, the cloud temporal change estimator 30 estimates a development state at target time. The temporal change of the development state of the cloud means an increase or a decrease in the density of cloud particles. This is more specifically explained below.

The cloud matcher 33 associates the cloud mass obtained in the present time frame t and the cloud mass obtained in the immediately preceding time frame t−Δt. The association is performed based on the positions of the cloud masses. As the positions of the cloud masses, center positions (center of gravity positions) of regions occupied by the cloud masses and heights corresponding to the center positions can be used. The cloud matcher 33 calculates a distance between the positions of the cloud masses and associates the cloud masses at the closest distance. In the following explanation, a cloud mass in the present time frame is represented by an index n and a cloud mass in the immediately preceding time frame corresponding to the cloud mass is also represented by the same index n.

The development/attenuation coefficient estimator 34 calculates a development/attenuation coefficient α based on a relation between a total of reflection intensities for each pixel of the cloud mass n in the present time frame and a total of reflection intensities for each pixel of the cloud mass n in the immediately preceding time frame. As an example, the development/attenuation coefficient estimator 34 calculates the development/attenuation coefficient α based on a ratio of these two totals. An example of a calculation formula for calculating the development/attenuation coefficient α according to a ratio of two reflection intensities is shown in the following expression. Since reflection intensity represents the density of cloud particles, α represents a rate of an increase or a decrease in the density of the cloud particles in time Δt.

[Expression 5]

$$\alpha = \frac{\sum_{i,j} A_n(t, i, j)}{\sum_{i,j} A_n(t - \Delta t, i, j)} \quad (5)$$

The cloud development/attenuation calculator 35 corrects a reflection coefficient of a cloud, an advection of which is estimated, with the following Expression (6) based on the development/attenuation coefficient α. The reflection coefficient after the correction is represented as $A''_n$. By correcting the reflection coefficient of the cloud, the advection of which is estimated, with Expression (6), it is possible to estimate a temporal change of a development state of the cloud (an increase or a decrease in the density of cloud particles).

[Expression 6]

$$A''_n(t, \tau, i, j) = \alpha^{\frac{\tau}{\Delta t}} A'_n(t, \tau, i, j) \quad (6)$$

As explained above, according to this embodiment, it is possible to estimate development and attenuation of a cloud as a temporal change of a state of the cloud in addition to a temporal change of a position.

Sixth Embodiment

In this embodiment, uncertainty in the dividing of the cloud and uncertainty in the estimation of the advection vector involved in the dividing of the cloud as in the first embodiment is treated by ensemble prediction. Presence of uncertainty in setting of a threshold in the dividing of the cloud using the luminance temperature explained in the first embodiment is explained as an example.

In the first embodiment, the cloud (the cloud image) is divided, based on the given threshold $T_1$ of the luminance temperature, the cloud present in the high layer having the luminance temperature lower than the threshold $T_1$ and the cloud in the lower layer having the luminance temperature equal to or higher than the threshold $T_1$. The cloud can be separated into water and ice clouds by setting $T_1$ to 0° C. (273K). However, actually, the cloud is not always ice at 0° C. or lower. It is also likely that a luminance temperature observed on a satellite image does not accurately coincide with an actual value. Accordingly, in this embodiment, candidates that a value of the threshold $T_1$ of the luminance temperature can take are generated. The processing of the cloud divider 20, the cloud temporal change estimator 30, and the cloud combiner 40 is performed for each of the candidates. The results of the processing performed for each of the candidates are combined. Consequently, it is possible to supplement the uncertainty and improve accuracy of advection estimation. This embodiment is explained in detail below.

Figure 20:
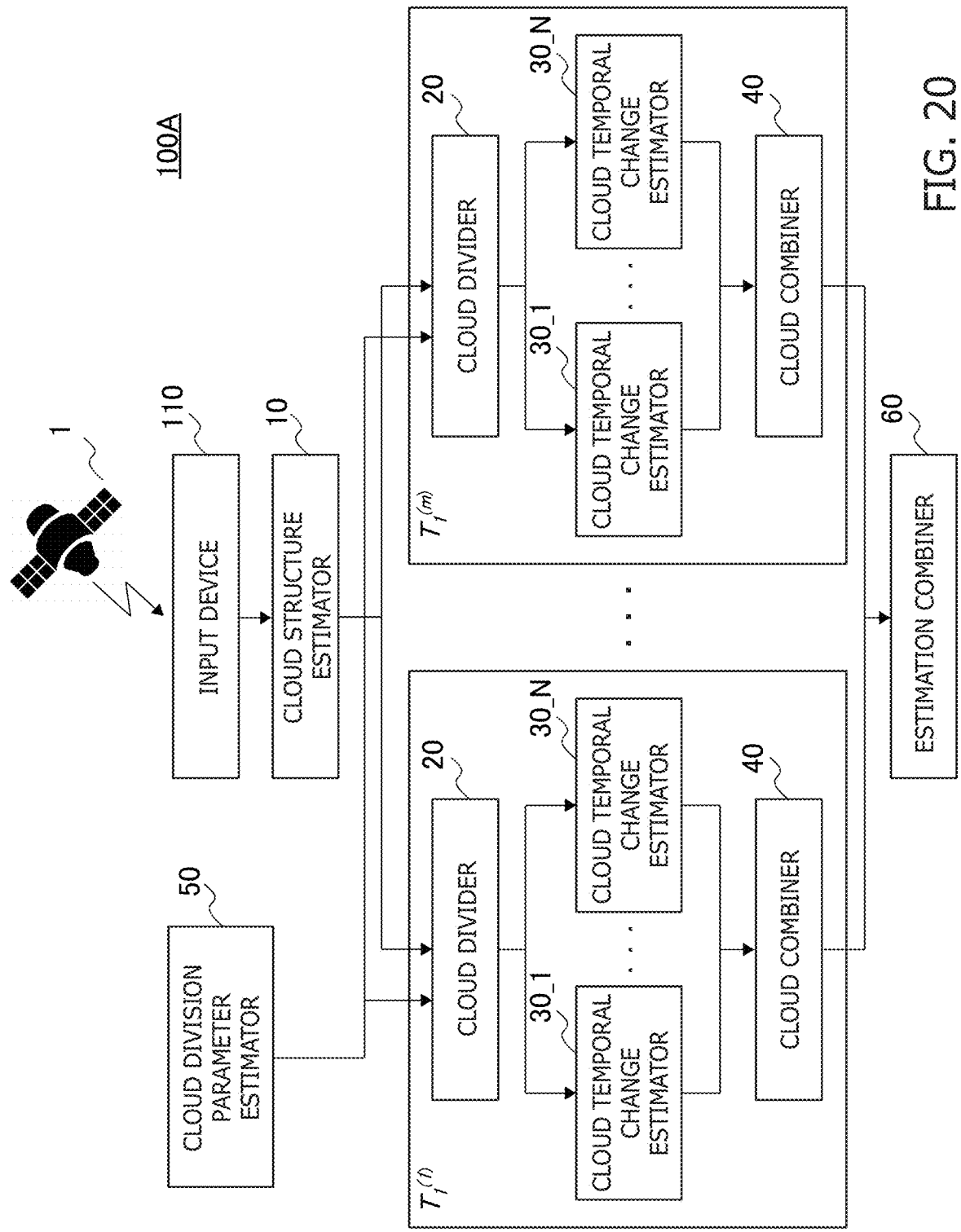
FIG. 20 is a block diagram of an example of a cloud movement estimation apparatus functioning as an information processing apparatus according to a sixth embodiment.

FIG. 20 is a block diagram of an example of a cloud movement estimation apparatus 100A functioning as an information processing apparatus according to this embodiment.

A cloud division parameter estimator 50 generates candidates $T_1^{(1)}$, $T_1^{(2)}$, ..., and $T_1^{(m)}$ that the value of the threshold $T_1$ of the luminance temperature can take. For example, the cloud division parameter estimator 50 generates $T_1^{(1)}=273-(m/2)\Delta T$, ..., $T_1^{(2)}=273-(m/2-1)\Delta T$, ..., and $T_1^{(m)}=273+(m/2-1)\Delta T$ as candidates considering possibility that the threshold of the luminance temperature can take a plurality of values near 273K. ΔT is any value and is, for example, ΔT=1.

Figure 21:
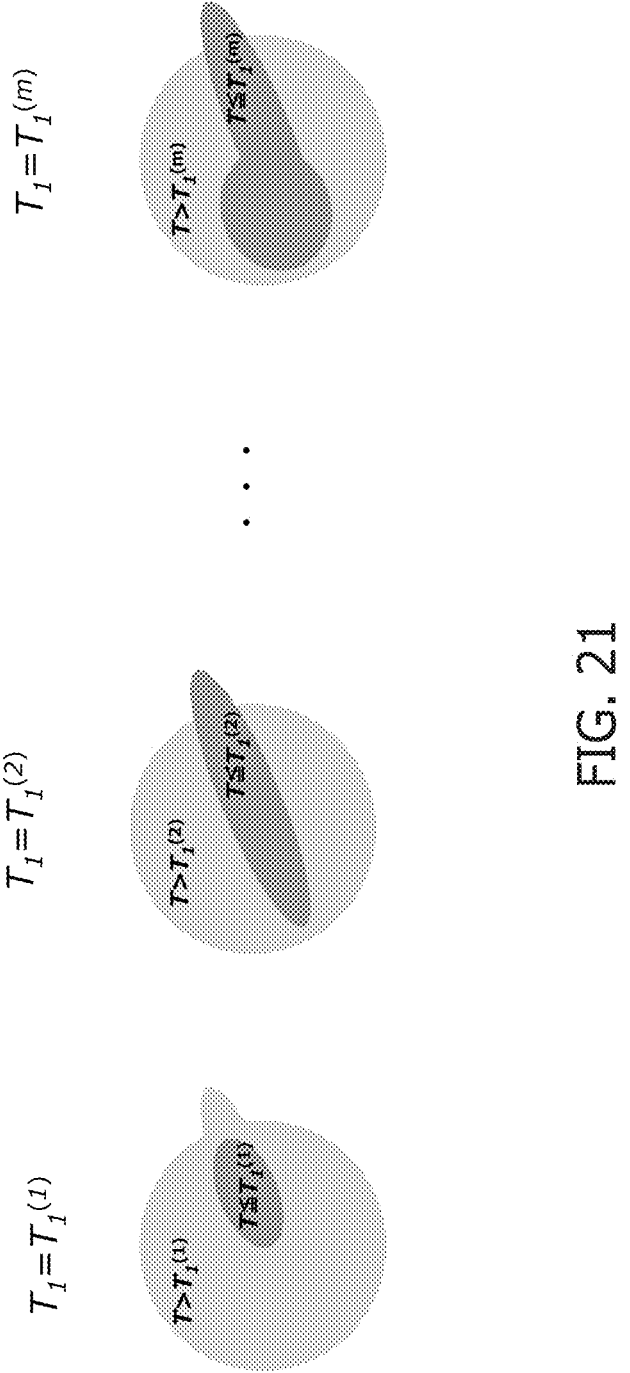
FIG. 21 is a diagram showing a difference in dividing of a cloud with a difference in a division parameter.

FIG. 21 shows a difference in dividing of a cloud with a difference in the division parameter $T_1$. A ratio of a cloud in a lower layer is higher as $T_1$ is lower. It is likely that an advection vector of the cloud also changes according to the increase in the ratio of the cloud in the lower layer.

M pieces of the processing of the cloud divider 20, the cloud temporal change estimator 30, and the cloud combiner 40 are respectively independently performed for the candidates of $T_1$.

An estimation combiner 60 combines results of independently performed estimation of a cloud position. Two examples will be explained below as a method of the combination. However, other methods are also possible.
(Derivation of an Average Value)

An amount desired to be estimated is represented as X. X is, for example, a center position of a cloud or a solar irradiance at a certain point. At this time, an average value is calculated by the following.

$$\hat{X} = \frac{1}{m}\sum_{i=1}^{m} X^{(i)}$$

$X^{(i)}$ is a value of X estimated from an i-th cloud combiner 40.
(Probabilistic Estimation)

For example, a probability distribution P(x) of X is calculated by the following expression using kernel density estimation.

[Expression 7]

$$P(X) = \frac{1}{m}\sum_{i=1}^{m} K(X, X^{(i)}) \qquad (7)$$

In Expression (7), K(X, X(i)) is a so-called kernel function and is given by, for example, the following expression.

[Expression 8]

$$K(X, X^{(i)}) = \frac{1}{\sqrt{2\pi\sigma^2}} \exp\left\{-\frac{1}{2\sigma^2}(X - X^{(i)})^2\right\} \qquad (8)$$

In Expression (8), a is a parameter representing width of the kernel function.

When the kernel density estimation is used, for example, the kernel function may be converted into a cumulative probability distribution and X corresponding to a predetermined probability (for example, 0.8) may be set as a final estimation result. A random number may be generated in a range of 0 to 1 and X corresponding to a value of the random number may be set as the final estimation result. Random numbers may be generated a plurality of times to calculate a plurality of X and an average of the plurality of X may be set as the final estimation result. Besides, the final estimation result may be calculated based on the kernel function by another method.

As explained above, according to this embodiment, it is possible to avoid a great error easily caused by single estimation and improve accuracy of the advection estimation by performing the advection estimation for each of a plurality of luminance candidates set as a threshold and integrating the advection estimation for each of temperature candidates.

Seventh Embodiment

In this embodiment, a function of using a result of numerical weather calculation is added to the first embodiment.

Figure 22:
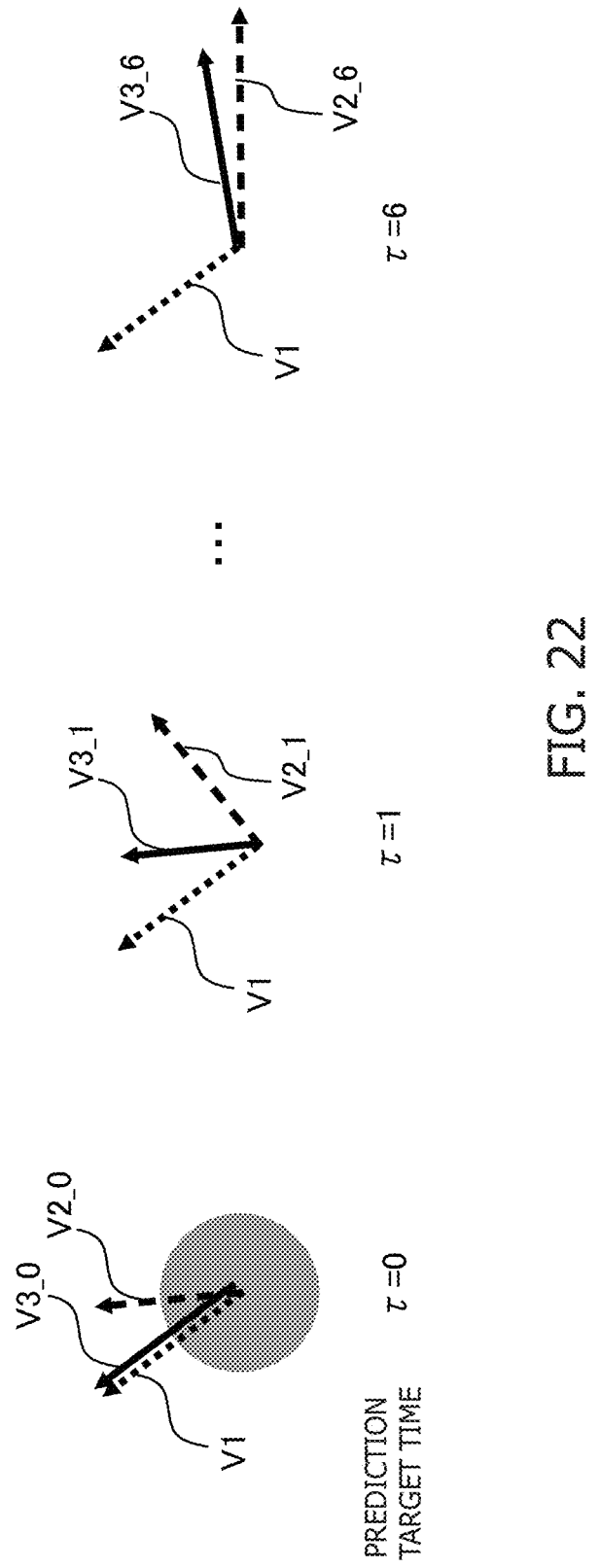
FIG. 22 is a diagram for explaining an overview of a seventh embodiment.

FIG. 22 is a diagram for explaining an overview of this embodiment. An advection vector V1 estimated by the cloud temporal change estimator 30 is considered accurately representing a direction in which a cloud moves at an estimated point in time (τ=0). In the first embodiment, an example is explained in which a position in future (τ=1 2, . . . ) of the cloud is calculated assuming that the advection vector basically does not change thereafter. However, when wind changes with time, it is predicted that a moving direction of the cloud deviates from an advection vector estimated first as the lead time τ increases. In this embodiment, an error of the advection vector is corrected using a result of the numerical weather calculation.

A change in weather based on dynamics of the air is calculated in the numerical weather calculation. Therefore, it is highly likely that an advection vector derived from the wind obtained by the numerical weather calculation becomes a more accurate estimation value than the advection vector V1 according to an increase in a prediction lead time. Advection vectors V2_0, V2_1, . . . , and V2_6 are advection vectors derived from the wind obtained by the numerical weather calculation at τ=0, 2, . . . , 6. Reliability of the advection vectors becomes higher than reliability of the advection vector V1 as time elapses.

Therefore, weights corresponding to a lead time are set for the advection vector V1 and the advection vectors V2 (V2_0 to V2_6) and both the vectors are combined to calculate advection vectors V3_0 to V3_6 used for advection calculation at τ=0, 2, . . . , 6. In setting the weights, the weight of the advection vector V1 is set larger at a start time (τ=0) of the advection calculation. For example, the weight of the advection vector V1 is set to 1 and the weight of the advection vector V2_0 is set to 0. The weight of the advection vector V1 is gradually reduced and the weight of the advection vector V2 is increased according to an increase in the lead time.

Figure 23:
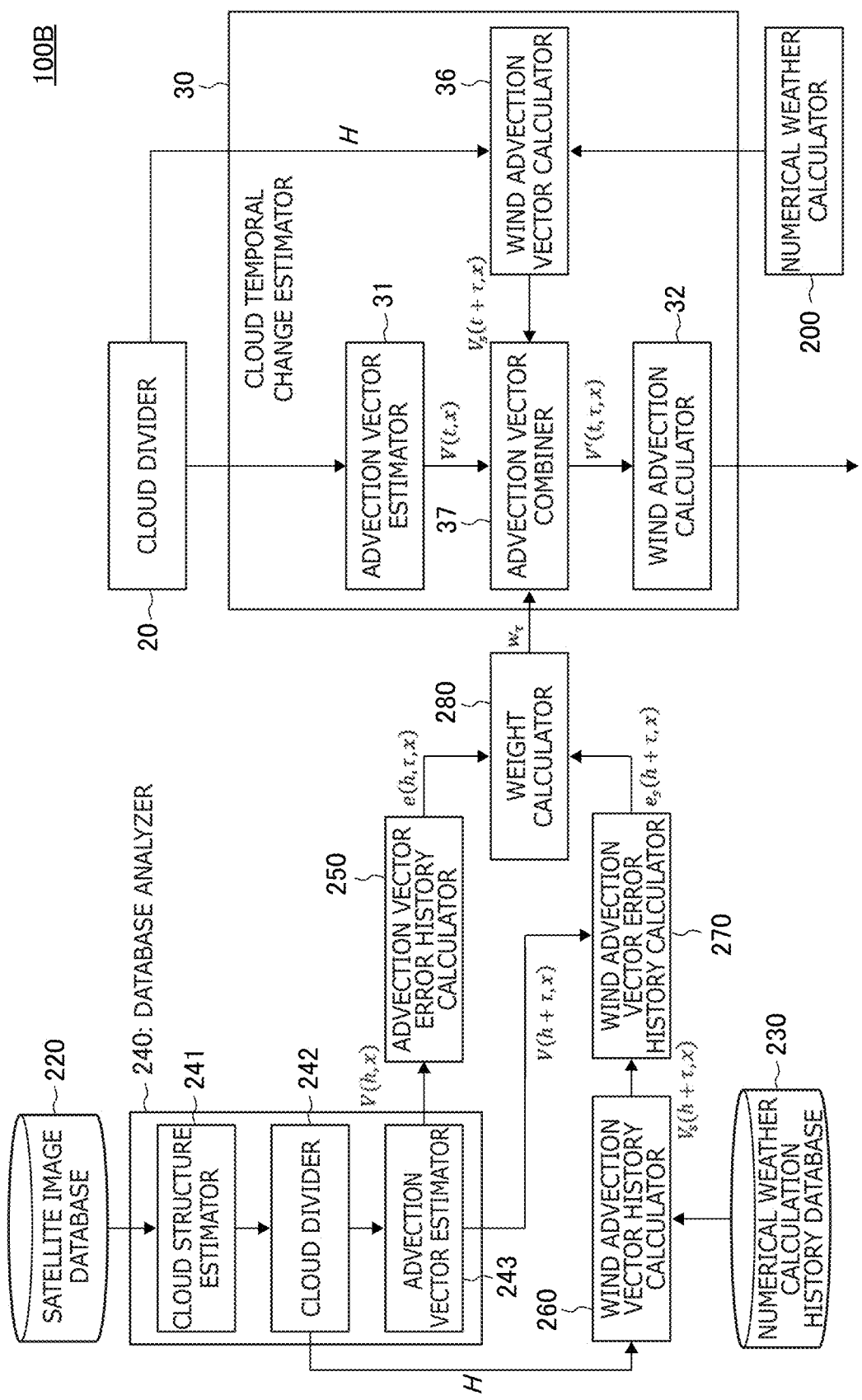
FIG. 23 is a block diagram of an example of a cloud movement estimation apparatus functioning as an information processing apparatus according to the seventh embodiment.

FIG. 23 is a block diagram of an example of a cloud movement estimation apparatus 100B functioning as an information processing apparatus according to this embodiment.

A numerical weather calculator 200 numerically models physical dynamics of the air (wind or the like) and calculates temporal development of the air. The numerical weather calculator 200 may calculate the temporal development using simulation software implemented with a model. The numerical weather calculator 200 can calculate estimation values of temperature, a wind direction and wind speed, air pressure, and humidity at any point and any time. Wind at time t, a position x, and altitude (height) z calculated by the numerical weather calculator 200 is represented as W(t, x, z). W(t, x, z) includes at least a wind direction and may include temperature, wind speed, and the like besides the wind direction. Note that this apparatus 100B may receive a result of numerical weather calculation from a server of an agency (the Meteorological Agency or the like).

A wind advection vector calculator 36 calculates a wind advection vector $V_s(t, x)$ from a wind field (for example, wind at which wind speed is blowing in which time in which direction and height at certain time) in the result of the numerical weather calculation. As an example, the wind advection vector includes information concerning a wind direction and wind speed. Since the wind induces an advection of a cloud, a wind advection vector is represented by the following expression using height $H_n$ of a cloud mass n.

[Expression 9]

$$V_s(t,x)=W(t,x,H_n(t,x)) \qquad (9)$$

In the following explanation, the advection vector calculated from the result of the numerical weather calculation in this way is referred to as wind advection vector.

An advection vector combiner 37 combines an advection vector V(t, x) in the time frame t estimated by the advection vector estimator 31 and a wind advection vector $V_s(t+\tau, x)$ calculated by the wind advection vector calculator 36 to calculate a combined advection vector (an advection vector V'(t, τ, x)) in the lead time τ. For example, weights of V(t, x) and $V_s(\tau+\tau, x)$ in the lead time τ are respectively represented as wτ(x) corresponding to first weight and 1−wτ(x) corresponding to second weight. The combined advection vector is calculated by the following expression. The weights wτ(x) and 1−wτ(x) are calculated by a weight calculator 280 explained below.

[Expression 10]

$$V'(t,\tau,x)=w\tau(x)V(t,x)+(1-w\tau(x))V_s(t+\tau,x) \quad (10)$$

A satellite image database 220 is a database storing satellite image data in the past for a fixed period (for example, several months or several years).

Figure 24:
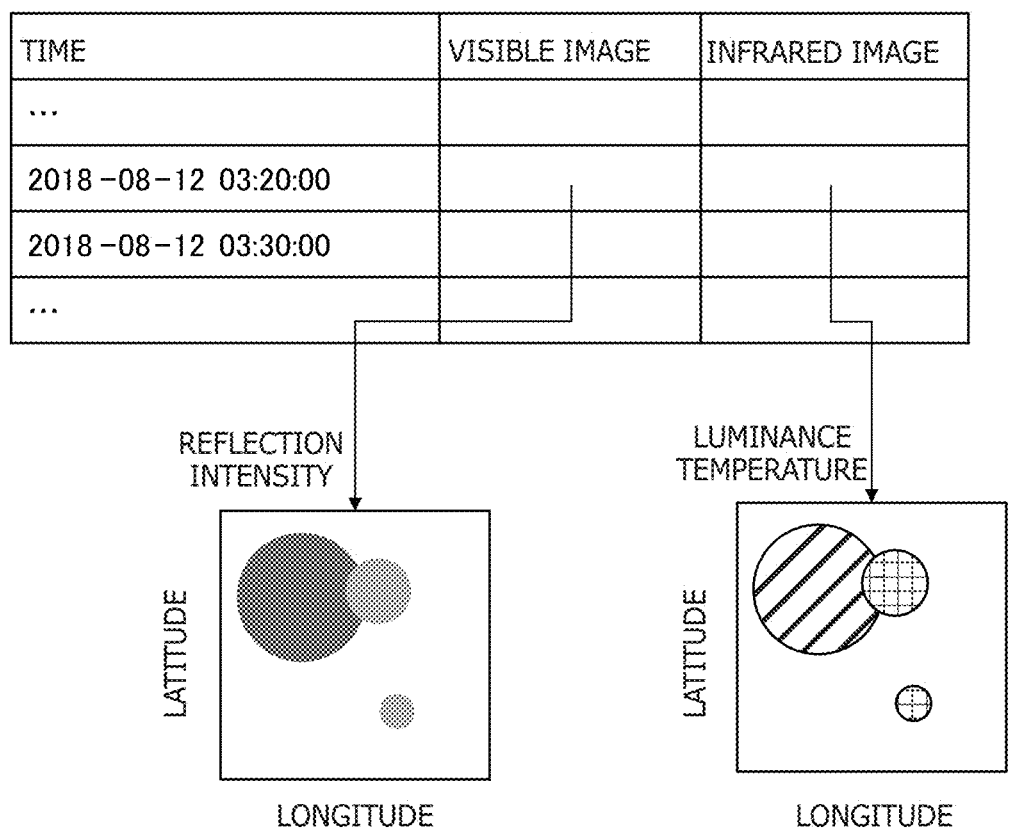
FIG. 24 is a diagram showing an example of a satellite image database.

FIG. 24 shows an example of the satellite image database 220. Data (a visible image) in a visible band and data (an infrared image) in an infrared band are stored for each time frame. The data in the visible band is a visible image including a value of reflection intensity for each pixel. The data in the infrared band is an infrared image including a value of a luminance temperature for each pixel.

A database analyzer 240 includes a cloud structure estimator 241, a cloud divider 242, and an advection vector estimator 243 having the same functions as the functions of the components having the same names in the first embodiment. The database analyzer 240 performs, with the same processing as the processing in the first embodiment, estimation of an advection vector for time frames of the satellite image data in the past stored in the satellite image database 220.

An advection vector error history calculator 250 calculates, based on the following expression, an error of the advection vector calculated for the satellite image data in the past.

[Expression 11]

$$e(h,\tau,x)=V(h,x)-V(h+\tau,x) \quad (11)$$

In Expression (11), V(h, x) represents an advection vector calculated from data at time h in the past in the satellite image database 220. V(h, x) corresponds to an advection vector at the time h. V(h, x) corresponds to a vector representing a direction and speed of movement in a position x estimated based on a satellite image at third time.

In Expression (11), V(h+τ, x) represents an advection vector calculated from data at time h+T in the past in the satellite image database 220. V(h+τ, x) representing the advection vector at the time h+'E corresponds to a vector representing a direction and speed of movement in the position x estimated based on a satellite image at fourth time later than the third time.

As an example, a time frame interval is Δt=Δτ but is not limited to this.

In Expression (11), e(h, τ, x) is an error (a difference) between the two advection vectors.

A numerical weather calculation history database 230 is a database storing a result of numerical weather calculation.

Figure 25:
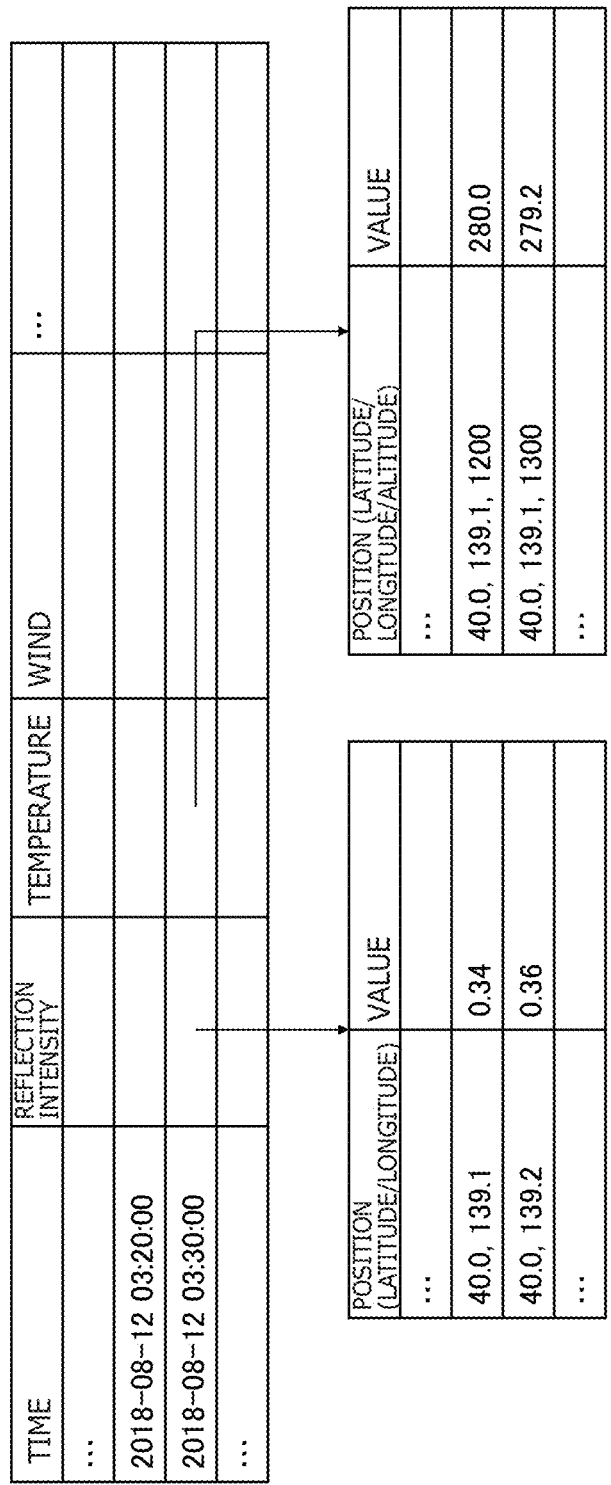
FIG. 25 is a diagram showing an example of a numerical weather calculation history database.

FIG. 25 shows an example of the numerical weather calculation history database 230. A numerical weather calculation result in a period and a region common to a period and a region covered by the satellite image database 220 is stored in the numerical weather calculation history database 230. Weather variables are stored for each time. In the example shown in the figure, weather variables such as reflection intensity, temperature, and wind are stored.

The weather variables for each time have a table format. When the weather variable is the reflection intensity, information concerning the reflection intensity is a table storing a value concerning the reflection intensity for each two-dimensional position (latitude and longitude). When the weather variable is the temperature, information concerning the temperature is a table storing a value concerning the temperature for each three-dimensional position (latitude, longitude, and altitude). When the weather variable is the wind, information concerning the wind is a table storing a value concerning a wind field for each three-dimensional position (latitude, longitude, and altitude).

The time of the numerical weather calculation history database 230 shown in FIG. 25 does not always need to coincide with a time frame of a satellite image. In this case, a value of the weather variable at time corresponding to the time frame only has to be obtained by interpolation.

A wind advection vector history calculator 260 calculates, based on the numerical weather calculation history database 230, a wind advection vector for cloud masses acquired by the cloud divider 20 of the database analyzer 240 and calculates a history of the wind advection vector. A method of calculating the wind advection vector is the same as the method of the wind advection vector calculator 36.

A wind advection vector error history calculator 270 obtains, based on the history of the wind advection vector calculated by the wind advection vector history calculator 260 and the history of the advection vector obtained by the database analyzer 240, a history of an error between the wind advection vector and the advection vector. The error of the wind advection vector is calculated based on Expression (12).

[Expression 12]

$$e_s(h+\tau,x)=V_s(h+\tau,x)-V(h+\tau,x) \quad (12)$$

In Expression (12), $V_s(h+\tau, x)$ is a wind advection vector at the lead time τ. $V_s(h+\tau, x)$ corresponds to a vector representing a wind direction and wind speed of the numerical weather calculation for the fourth time.

In Expression (12), $e_s(h+\tau, x)$ is an error (a difference) between a wind advection vector $V_s(h+\tau, x)$ at the time h+τ and an advection vector V(h+τ, x) at the time h+τ.

A weight calculator 280 calculates weight wτ(x) given to the advection vector V(t, x) and weight 1−wτ(x) given to the wind advection vector $V_s(t+\tau, x)$.

The weight calculator 280 calculates the weight wτ(x) with the following expression. Therefore, weight is calculated based on a history in the past.

[Expression 13]

$$w_\tau(x) = \frac{\sum_h (e_s(h+\tau,x))^2}{\sum_h \{(e_s(h+\tau,x))^2 + (e(h,\tau,x))^2\}} \quad (13)$$

The weight is calculated for each position (point) x. When it is assumed that the weight does not greatly change for each point, weight averaged at all points may be used as indicated by the following expression.

[Expression 14]

$$w_\tau = \frac{\sum_x w_\tau(x)}{\sum_x 1} \quad (14)$$

The times (the third time and the fourth time) of the history in the past used for the calculation of the weight may be any times if the times are before the present time frame. However, when the times are close to the present time frame, more accurate advection estimation can be expected.

As explained above, according to this embodiment, advection estimation for a cloud (in particular, estimation of a position of the cloud) can be accurately performed by using the result of the numerical weather calculation.

Eighth Embodiment

In an eighth embodiment, the result of the estimation of the cloud position in the first embodiment and the result of the numerical weather calculation are combined to estimate reflection intensity of the estimated cloud (cloud mass). In the seventh embodiment, the advection vector obtained halfway in the estimation of the cloud position and the wind advection vector based on the result of the numerical weather calculation are combined. In the eighth embodiment, reflection intensity of a cloud (a cloud mass) obtained as a result of advection estimation and reflection intensity based on a result of numerical weather calculation are combined. By combining the estimation of the cloud position in the first embodiment excellent in short-time prediction and the result of the numerical weather calculation excellent in long-time prediction, accurate prediction is possible irrespective of the length of a prediction time.

Figure 26:
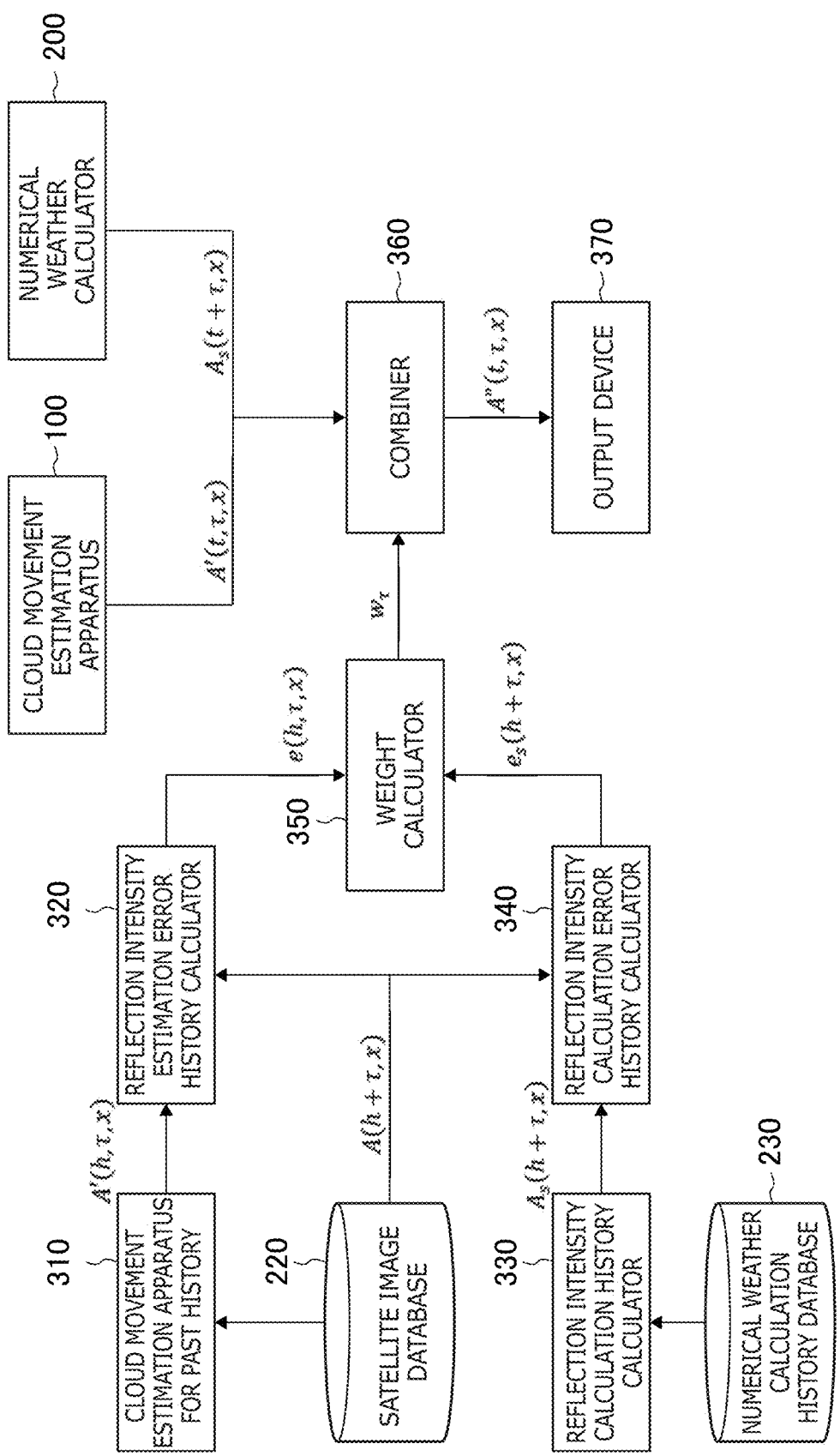
FIG. 26 is a block diagram of an example of a cloud movement estimation system functioning as an information processing apparatus according to an eighth embodiment.

FIG. 26 is a block diagram of an example of a cloud movement estimation system functioning as an information processing apparatus according to this embodiment.

The cloud movement estimation apparatus 100 is the same as the cloud movement estimation apparatus (see FIG. 1) according to the first embodiment. The numerical weather calculator 200, the satellite image database 220, and the numerical weather calculation history database 230 are the same as those in the seventh embodiment (see FIG. 23).

A cloud movement estimation apparatus for past history 310 calculates, based on the past history of the satellite image in the satellite image database 220, an estimation value A'(h, τ, x) of reflection intensity at time h, a lead time τ, and a position x of a time frame in the past. The cloud movement estimation apparatus for past history 310 has the same configuration as the configuration of the cloud movement estimation apparatus 100. The cloud movement estimation apparatus 100 may function as the cloud movement estimation apparatus for past history 310 as well. In this case, the cloud movement estimation apparatus for past history 310 may be omitted.

A reflection intensity estimation error history calculator 320 calculates, based on the satellite image database 220, with the following expression, an error of the reflection intensity A'(h, τ, x) estimated by the cloud movement estimation apparatus for past history 310.

[Expression 15]

$$e(h,\tau,x) = A'(h,\tau,x) - A(h+\tau,x) \quad (15)$$

The reflection intensity A'(h, τ, x) represents reflection intensity in positions of a region (an imaging region of a satellite image) including a cloud at time (h+τ) under estimation.

In Expression (15), A(h+τ, x) is reflection intensity in the position x at the time h+τ stored in the satellite image database 220. That is, A(h+τ, x) represents reflection intensity for each pixel of a satellite image (a captured image) at the time h+τ.

In Expression (15), e(h, τ, x) represents a difference between reflection intensity for each position x estimated for fourth time (h+τ) based on a satellite image (a captured image) at the third time (h) and reflection intensity for each pixel based on a satellite image at the fourth time.

In Expression (15), Δτ is the same as Δt of a time interval (a time interval of a time frame) at which a satellite image is acquired but is not limited to this.

A reflection intensity calculation history calculator 330 acquires, from the numerical weather calculation past history database, as a result of numerical weather calculation in the past, reflection intensity $A_s$(h+τ, x) at the time h+τ and in the position x.

A reflection intensity calculation error history calculator 340 calculates an error of reflection intensity of numerical weather calculation with the following expression.

[Expression 16]

$$e_s(h+\tau,x) = A_s(h+\tau,x) - A(h+\tau,x) \quad (16)$$

In Expression (16), $e_s$(h+τ, x) corresponds to a difference between reflection intensity in a pre-position of numerical weather calculation for the fourth time (h+τ) and reflection intensity for each pixel based on a satellite image at the fourth time.

As in the seventh embodiment, a weight calculator 350 calculates weight wτ(x) at the lead time τ and in the position x with the following expression.

[Expression 17]

$$w_\tau(x) = \frac{\sum_h (e_s(h+\tau,x))^2}{\sum_h \{(e_s(h+\tau,x))^2 + (e(h,\tau,x))^2\}} \quad (17)$$

When it is assumed that the weight does not greatly change for each point, weight averaged in all points may be used as indicated by the following expression.

[Expression 18]

$$w_\tau = \frac{\sum_x w_\tau(x)}{\sum_x 1} \quad (18)$$

A combiner 360 weights, with wτ corresponding to third weight, the reflection intensity A'(t, τ, x) in the time frame t, the lead time τ, and the position x estimated by the cloud movement estimation apparatus 100. The combiner 360 weights, with 1−wτ(x) corresponding to fourth weight, the reflection intensity As(t+τ, x) at the time t+τ and in the position x estimated by the numerical weather calculator 200. The combiner 360 totals (combines) these weighted reflection intensities to calculate a new estimation value A"(t, τ, x) of reflection intensity. An expression for calculating A"(t, τ, x) is described below.

[Expression 19]

$$A''(t,\tau,x)=w\tau(x)A'(t,\tau,x)+(1-w\tau(x))A_s(t+\tau,x) \quad (19)$$

That is, the combiner 360 sets the third weight in estimated reflection intensities in positions, sets the fourth weight in reflection intensities in the positions of numerical weather calculation, and combines the reflection intensities based on the third weight and the fourth weight to thereby estimate reflection intensities in the positions at the time (t+τ) under estimation.

An output device outputs (for example, displays on a screen) information based on new reflection intensity calculated by the combiner 360.

As explained above, according to this embodiment, it is possible to accurately perform advection estimation for a cloud (in particular, estimation of a development state of the cloud) by using a result of the numerical weather calculation.

Ninth Embodiment

There is estimation of a solar irradiance on the ground surface as one of important applications of cloud movement estimation. In recent years, solar power generation has been spread. In the case of the solar power generation, a power generation amount depends on the solar irradiance. It is necessary to grasp the power generation amount in advance in order to effectively or efficiently utilize electric power. Prediction of the solar irradiance is necessary in order to grasp the power generation amount. In this embodiment, a solar irradiance estimator is added to the cloud movement estimation apparatus 100 according to the first embodiment to thereby enable estimation of the solar irradiance.

Figure 27:
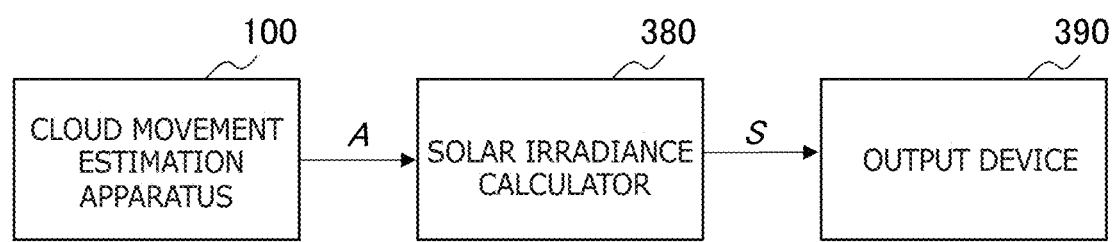
FIG. 27 is a block diagram of an example of a solar irradiance estimation apparatus functioning as an information processing apparatus according to a ninth embodiment.

FIG. 27 is a block diagram of an example of a solar irradiance estimation apparatus functioning as an information processing apparatus according to this embodiment.

The cloud movement estimation apparatus 100 is the same as the cloud movement estimation apparatus (see FIG. 1) according to the first embodiment.

A solar irradiance calculator 380 calculates, based on reflection intensity R(t, τ, x) in the time frame t, the lead time τ, and the position (the point) x estimated by the cloud movement estimation apparatus 100, a ground surface solar irradiance corresponding to the point x (a ground surface solar irradiance at a point right under the point x).

Several methods are known as a method of calculating a ground surface solar irradiance S based on the reflection intensity R of a cloud. For example, relatively simple modeling is performed. However, the following expression may be used (see Reference Document 8).

$$S = I\cos\theta\frac{1-R}{1-AA_G} \quad (20)$$

$I$: solar constant $\left(\frac{W}{m^2}\right)$ $\theta$: zenith angle of the sun $A_G$: ground surface albedo In Expression (20), I represents energy (work) received per unit area and unit time on a surface perpendicular to radiation from the sun at the upper end of the Atmosphere of the Earth. Although there is seasonal fluctuation, an average value is approximately 1.37×10³ (W/m²).

In Expression (20), θ represents a zenith angle of the sun. The zenith angle can be calculated from date and time.

In Expression (20), $A_G$ is a ground surface albedo. The ground surface albedo can be calculated from remote sensing data.

As explained above, according to this embodiment, it is possible to accurately estimate a solar irradiance on the ground surface.

(Hardware Configuration)

Figure 28:
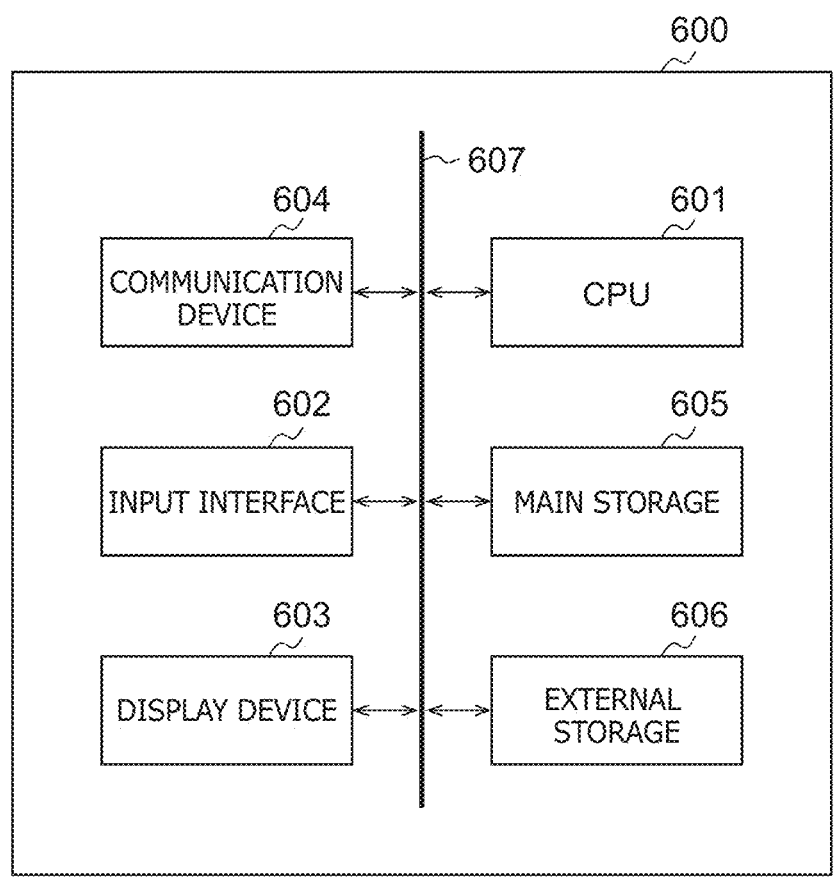
FIG. 28 is a hardware block diagram of an information processing apparatus according to an embodiment of the present invention.

FIG. 28 illustrates a hardware configuration of the information processing device which is a cloud movement estimation apparatus according to each embodiment. The information processing device is configured as a computer device 600. The computer device 600 includes a CPU 601, an input interface 602, a display device 603, a communication device 604, a main storage device 605, and an external storage device 606, and these components are mutually connected through a bus 607.

The CPU (central processing unit) 601 executes an information processing program as a computer program on the main storage device 605. The information processing program is a computer program configured to achieve each above-described functional component of the present device. The information processing program may be achieved by a combination of a plurality of computer programs and scripts instead of one computer program. Each functional component is achieved as the CPU 601 executes the information processing program.

The input interface 602 is a circuit for inputting, to the present device, an operation signal from an input device such as a keyboard, a mouse, or a touch panel. The input interface 602 corresponds to the input device 120.

The display device 603 displays data output from the present device. The display device 603 is, for example, a liquid crystal display (LCD), an organic electroluminescence display, a cathode-ray tube (CRT), or a plasma display (PDP) but is not limited thereto. Data output from the computer device 600 can be displayed on the display device 603.

The communication device 604 is a circuit for the present device to communicate with an external device in a wireless or wired manner. Data can be input from the external device through the communication device 604. The data input from the external device can be stored in the main storage device 605 or the external storage device 606.

The main storage device 605 stores, for example, the information processing program, data necessary for execution of the information processing program, and data generated through execution of the information processing program. The information processing program is loaded and executed on the main storage device 605. The main storage device 605 is, for example, a RAM, a DRAM, or an SRAM but is not limited thereto. Each storage or database in the information processing device in each embodiment may be implemented on the main storage device 605.

The external storage device 606 stores, for example, the information processing program, data necessary for execution of the information processing program, and data generated through execution of the information processing program. The information processing program and the data are read onto the main storage device 605 at execution of the information processing program. The external storage device 606 is, for example, a hard disk, an optical disk, a flash memory, or a magnetic tape but is not limited thereto. Each storage or database in the information processing device in each embodiment may be implemented on the external storage device 606.

The information processing program may be installed on the computer device 600 in advance or may be stored in a storage medium such as a CD-ROM. Moreover, the information processing program in each embodiment may be uploaded on the Internet.

The cloud movement estimation apparatus may be configured as a single computer device 600 or may be configured as a system including a plurality of mutually connected computer devices 600.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

REFERENCE DOCUMENT LIST

Reference Document 1
Kazuyori Ozeki, Yukio Sasaki. Overview of Stationary Meteorological Satellites Himawari 8 and 9 (Ground system summary report of Himawari 8 and 9). Meteorological Satellite Center Technical Report, pp. 3 to 16, 2016.
Reference Document 2
Maarten Reyniers. Quantitative precipitation forecasts based on radar observations: Principles, algorithms and operational systems. Institut Royal M'et'eorologique de Belgique, 2008.
Reference Document 3
Jerome Friedman, Trevor Hastie, Robert Tibshirani, et al. The elements of statistical learning, Vol. 1.
Springer series in statistics New York, 2001.
Reference Document 4
Mryka Hall-Beyer. GLCM texture: a tutorial. National Council on Geographic Information and Analysis Remote Sensing Core Curriculum, Vol. 3, p. 75, 2000.
Reference Document 5
M Lalitha, M Kiruthiga, and C Loganathan. A survey on image segmentation through clustering algorithm. International Journal of Science and Research, Vol. 2, No. 2, pp. 348-358, 2013.
Reference Document 6
Benoit Cushman-Roisin and Jean-Marie Beckers. Introduction to geophysical fluid dynamics: physical and numerical aspects. Academic press, 2011.
Reference Document 7
Gerhard Winkler. Image analysis, random fields and Markov chain Monte Carlo methods: a mathe-matical introduction, Vol. 27. Springer Science & Business Media, 2012.
Reference Document 8
G Dedieu, P Y Deschamps, and Y H Kerr. Satellite estimation of solar irradiance at the surface of the earth and of surface albedo using a physical model applied to metcosat data. Journal of Applied Meteorology and Climatology, Vol. 26, No. 1, pp. 79-87, 1987.

The invention claimed is:
1. An information processing apparatus comprising:
receiving circuitry configured to receive data acquired by sensing a cloud by a meteorological satellite at predetermined intervals via radio from the meteorological satellite, the data including a temperature distribution or a captured image of the cloud,
processing circuitry configured to
divide the cloud according to a plurality of height ranges based on the data to acquire one or more portions for each of the height ranges,
collect one or more portions belonging to distances less than or equal to a threshold value to form one or more cloud masses, for each of the height ranges,
estimate a direction and speed of movement of each cloud mass based on the data,
estimate at least one of a position and a shape of each cloud mass at target time in future later than sensing time of the data based on the estimated direction and the estimated speed, and
estimate advection of the cloud based on the position and the shape of each cloud mass estimated at the predetermined intervals; and
a solar radiation estimation circuit configured to estimate a solar irradiance to a ground surface based on an estimated result of advection of the cloud
wherein the estimated result of advection of the cloud includes reflection intensities at each position of the cloud in a horizontal direction.
2. The information processing apparatus according to claim 1, wherein the temperature distribution is an infrared image of the cloud.
3. The information processing apparatus according to claim 1, wherein the processing circuitry acquires the one or more portions by dividing the cloud for each plurality of temperature ranges based on the temperature distribution, and the plurality of temperature ranges corresponds to the plurality of height ranges.
4. The information processing apparatus according to claim 1, wherein the processing circuitry generates a visible image of the cloud based on the estimated position and the estimated shape of each cloud mass.
5. The information processing apparatus according to claim 1, wherein
the processing circuitry divides the cloud into the one or more portions by segmenting the captured image based on feature values of pixels included in the captured image of the cloud.
6. The information processing apparatus according to claim 1, wherein the processing circuitry estimates, based on a range adjacent between a first portion and another portion in a boundary of the first portion among the one or more portions, whether another cloud is present in a lower layer under the first portion or a range in which another cloud is present in a lower layer under the first portion.
7. The information processing apparatus according to claim 1, wherein the processing circuitry estimates, based on a position of the cloud for each of the portions at second time estimated based on the sensing data at first time, whether another cloud is present or a range in which another cloud is present in a lower layer under the one or more portions of the cloud obtained based on the sensing data at the second time.
8. The information processing apparatus according to claim 1, wherein the processing circuitry estimates, based on a difference between a development state of the cloud mass based on the sensing data at first time and a development state of the cloud mass based on the sensing data at second time later than the first time, a development state of the cloud mass at the target time later than the second time.
9. The information processing apparatus according to claim 1, wherein the processing circuitry estimates a posi- tion of the cloud mass based on the estimated direction and the estimated speed of the movement and a wind direction and wind speed of numerical weather calculation.

10. The information processing apparatus according to claim 9, wherein the processing circuitry sets first weight in a first vector of the direction and the speed of the movement estimated for each cloud mass, sets second weight in a second vector of a wind direction and wind speed corresponding to a position of the cloud mass by the numerical weather calculation, and combines the first vector and the second vector based on the first weight and the second weight to thereby estimate the position of each cloud mass.

11. The information processing apparatus according to claim 10, wherein the processing circuitry calculates the first weight and the second weight based on a difference between a direction and speed of the movement estimated based on the sensing data at third time and a direction and speed of the movement estimated based on the sensing data at fourth time later than the third time, and a difference between the direction and the speed of the movement estimated based on the sensing data at the fourth time and a wind direction and wind speed of the numerical weather calculation for the fourth time.

12. The information processing apparatus according to claim 1, wherein
the sensing data includes a captured image of a first region including the cloud, and a pixel of the captured image represent reflection intensity of a position corresponding to the pixel,
the processing circuitry
estimates reflection intensities in positions of the first region at the target time, and
combines the estimated reflection intensities in the positions and reflection intensities in positions of the first region of numerical weather calculation.

13. The information processing apparatus according to claim 12, wherein the processing circuitry sets third weight in the estimated reflection intensities in the positions, sets fourth weight in the reflection intensities in the positions of the first region of the numerical weather calculation, and combines the reflection intensities based on the third weight and the fourth weight.

14. The information processing apparatus according to claim 13, wherein the processing circuitry calculates the third weight and the fourth weight based on a difference between reflection intensity for each of the positions estimated for fourth time based on a captured image at third time and reflection intensity for each of the pixels based on a captured image at the fourth time, and a difference between the reflection intensity for each of the pixels based on the captured image at the fourth time and reflection intensities in the positions of the numerical weather calculation for the fourth time.

15. The information processing apparatus according to claim 1, wherein
the sensing data includes a capture image of a first region including the cloud, and a pixel of the captured image represents reflection intensity in a position corresponding to the pixel,
the processing circuitry
estimates reflection intensities in positions of the first region at the target time, and
calculates a solar irradiance on a ground surface based on the reflection intensities in the estimated positions.

16. The information processing apparatus according to claim 1, wherein the target time is time later than time when the cloud is sensed.

17. The information processing apparatus according to claim 1, wherein the processing circuitry further estimates position information of the cloud based on the sensing data.

18. The information processing apparatus according to claim 1, wherein the height information includes height for each position in a horizontal direction of the cloud.

19. An information processing method comprising:
receiving data acquired by sensing a cloud by a meteorological satellite at predetermined intervals via radio from the meteorological satellite, the data including a temperature distribution or a captured image of the cloud;
dividing the cloud according to a plurality of height ranges based on the data to acquire one or more portions for each of the height ranges;
collecting one or more portions belonging to distances less than or equal to a threshold value to form one or more cloud masses, for each of the height ranges;
estimating a direction and speed of movement of each cloud mass based on the data;
estimating at least one of a position and a shape of each cloud mass at target time in future later than sensing time of the data based on the estimated direction and the estimated speed;
estimating advection of the cloud based on the position and the shape of each cloud mass estimated at the predetermined intervals; and
estimating a solar irradiance to a ground surface based on an estimated result of advection of the cloud;
wherein the estimated result of advection of the cloud includes reflection intensities at each position of the cloud in a horizontal direction.

20. A non-transitory computer readable medium having a computer program stored therein which when executed by a computer, causes the computer to perform processes comprising:
receiving data acquired by sensing a cloud by a meteorological satellite at predetermined intervals via radio from the meteorological satellite, the data including a temperature distribution or a captured image of the cloud;
dividing the cloud according to a plurality of height ranges based on the data to acquire one or more portions for each of the height ranges;
collecting one or more portions belonging to distances less than or equal to a threshold value to form one or more cloud masses, for each of the height ranges;
estimating a direction and speed of movement of each cloud mass based on the data;
estimating at least one of a position and a shape of each cloud mass at target time in future later than sensing time of the data based on the estimated direction and the estimated speed;
estimating advection of the cloud based on the position and the shape of each cloud mass estimated at the predetermined intervals; and
estimating a solar irradiance to a ground surface based on an estimated result of advection of the cloud,
wherein the estimated result of advection of the cloud includes reflection intensities at each position of the cloud in a horizontal direction.

* * * * *